(12) United States Patent
Arena

(10) Patent No.: US 12,595,445 B1
(45) Date of Patent: Apr. 7, 2026

(54) TRANSPARENT ALCOHOL BREWING SYSTEM

(71) Applicant: 4th Wave Craft LLC, Cornelius, NC (US)

(72) Inventor: Julian Arena, Cornelius, NC (US)

(73) Assignee: 4th Wave Craft LLC, Cornelius, NC (US)

( * ) Notice: Subject to any disclaimer, the term of this patent is extended or adjusted under 35 U.S.C. 154(b) by 910 days.

(21) Appl. No.: 17/868,979

(22) Filed: Jul. 20, 2022

Related U.S. Application Data

(60) Provisional application No. 63/224,444, filed on Jul. 22, 2021.

(51) Int. Cl.
*C12C 11/00* (2006.01)
*C12C 13/02* (2006.01)
*C12C 13/10* (2006.01)

(52) U.S. Cl.
CPC ............ *C12C 11/006* (2013.01); *C12C 13/02* (2013.01); *C12C 13/10* (2013.01)

(58) Field of Classification Search
CPC ..... C12C 11/003; C12C 11/006; C12C 13/02; C12C 13/10
See application file for complete search history.

(56) References Cited

U.S. PATENT DOCUMENTS

| | | | |
|---|---|---|---|
| 447,484 A | 3/1891 | Zwietusch | |
| 1,785,316 A | 12/1930 | Kimmel | |
| 2,140,816 A | 12/1938 | Seitz | |
| D193,779 S | 10/1962 | Haselton | |
| 3,366,033 A | 1/1968 | Bishop | |
| 3,690,838 A | 9/1972 | Luckey | |
| 4,494,451 A * | 1/1985 | Hickey | C12C 13/10 |
| | | | 99/276 |
| D278,457 S | 4/1985 | Schroder et al. | |
| 4,653,388 A * | 3/1987 | Wilkinson | C12C 7/22 |
| | | | 426/16 |
| 5,365,830 A * | 11/1994 | MacLennan | B67D 1/06 |
| | | | 137/170.1 |

(Continued)

FOREIGN PATENT DOCUMENTS

| | | | | |
|---|---|---|---|---|
| DE | 102014202768 B3 * | 6/2015 | ............. | C12C 7/065 |
| DE | 102021108919 A1 * | 10/2022 | ............... | C12C 3/08 |

(Continued)

OTHER PUBLICATIONS

TheBrewery, reddit.com, First available date Dec. 5, 2022. Retrieved from the internet May 21, 2025, https://www.reddit.com/r/TheBrewery/comments/zdse0s/i_started_making_glass_homebrewing_systems_in_my/?rdt=60734 (Year: 2022).

(Continued)

*Primary Examiner* — Reginald Alexander

(74) *Attorney, Agent, or Firm* — Stanek Lemon Crouse Meeks, PA

(57) ABSTRACT

Provided by aspects of the present inventive concept are a brewing system including at least one vessel utilized therein, for example, a grist case; a mash/lauter tun; a recirculation vessel; a boil kettle; a hopback; a whirlpool; and/or at least one fermenter that is transparent. Also provided by the inventive concept are a process of using the brewing system, and beverages prepared using the brewing system and/or process.

19 Claims, 27 Drawing Sheets

(56)                    References Cited

U.S. PATENT DOCUMENTS

| | | | | |
|---|---|---|---|---|
| D440,458 | S | 4/2001 | Ohu | |
| D810,498 | S | 2/2018 | Westfall et al. | |
| D812,953 | S | 3/2018 | Berberet et al. | |
| D879,529 | S | 3/2020 | Kucera | |
| D892,529 | S | 8/2020 | Fei | |
| 10,968,419 | B1 * | 4/2021 | Lanning | C12C 13/10 |
| D961,318 | S | 8/2022 | Kucera et al. | |
| 11,788,037 | B2 * | 10/2023 | Taylor, II | C12C 7/20 |
| | | | | 426/16 |
| D1,066,561 | S | 3/2025 | Pawlak | |
| 2011/0274785 | A1 * | 11/2011 | Boyce | C12C 7/04 |
| | | | | 99/276 |
| 2014/0234482 | A1 | 8/2014 | Kempfert | |
| 2015/0329808 | A1 * | 11/2015 | Ramsey | C12C 13/10 |
| | | | | 99/276 |
| 2022/0186161 | A1 * | 6/2022 | Toombs | C12C 13/10 |

FOREIGN PATENT DOCUMENTS

| | | | | |
|---|---|---|---|---|
| WO | WO-2018195589 | A1 * | 11/2018 | C12C 7/165 |
| WO | WO-2020025545 | A1 * | 2/2020 | C12C 7/205 |

OTHER PUBLICATIONS

Outsider Brewing, outsiderbrewing.beer, First available date 2025. Retrieved from the internet May 21, 2025, https://outsiderbrewing. beer/pages/our-system (Year: 2025)No Information Found. Please add manually.

* cited by examiner

TRANSPARENT ALCOHOL BREWING SYSTEM

RELATED APPLICATION DATA

The present application claims priority from and the benefit of U.S. Provisional Patent Application No. 63/224,444, filed Jul. 22, 2021, and U.S. Design patent application Ser. No. 29/832,364, filed Mar. 28, 2022, the disclosures of each of which is hereby incorporated herein by reference in its entirety.

FIELD

The presently disclosed subject matter relates generally to a functional brewing system that allows insight into the brewing process through the use of transparent brewing vessels. This system can serve a small brewery as a production system or a larger brewery as research and development, pilot batch and/or display system.

BACKGROUND

Conventional brewing tours and brewing diagrams in the taprooms of breweries are the only way to educate people first-hand on the brewing process. Some breweries employ small batch programs to emphasize specialty ingredients.

Some breweries have very in-depth tours that cost extra and provide some visual aids in the brewing process and interface with real ingredients. Some have detailed animations and displays depicting the process, but none have a tangible product of the demonstration that a consumer can purchase.

SUMMARY

In an aspect of the present inventive concept, provided is a system, wherein the system includes: a grist case; a mash/lauter tun; a recirculation vessel; a boil kettle; a hopback; a whirlpool; a heat exchanger; and/or at least one fermenter, and wherein at least one, any combination, or all of the grist case, mash/lauter tun, recirculation vessel, boil kettle, hopback, whirlpool, and at least one fermenter is transparent. In some aspects of the present inventive concept, the grist case, recirculation vessel, and/or hopback are optionally present.

In another aspect of the inventive concept, provided is a process of preparing a beverage, wherein the process includes: providing grain, such as milled grain, to a mash/lauter tun; generating a wort or sweet wort; circulating the wort or sweet wort from the mash/lauter tun through a recirculation vessel; transferring the wort or sweet wort from the recirculation vessel to a boil kettle; transferring wort or sweet wort from the boil kettle to a hopback; passing the wort or sweet wort through an agricultural product in the hopback; transferring the wort or sweet wort from the hopback to a whirlpool; passing the wort or sweet wort from the whirlpool through a heat exchanger; and transferring the wort or sweet wort passing through the heat exchanger to a fermenter, wherein at least one of the mash/lauter tun, recirculation vessel, boil kettle, hopback, whirlpool, and/or fermenter is transparent. In another aspect, the process may include providing grain from a grist case, wherein in another aspect, the grist case is transparent.

Other aspects of the inventive concept include a beverage prepared using the system and/or process of the inventive concept. In some of these aspects of the inventive concept, the beverage may be beer, wine, coffee, tea, kombucha, water kefir, or ginger beer. In some of these aspects of the inventive concept, the beverage may be a beer.

BRIEF DESCRIPTION OF THE DRAWINGS

FIG. 1 depicts a front perspective view of the brewing system according to some aspects of the inventive concept, which includes a transparent grist case (F), transparent mash/lauter tun (E), transparent recirculation vessel (D), transparent a boil kettle (C), a transparent hopback (B), and a transparent whirlpool (A).

FIG. 2 depicts another (front) view of the brewing system shown in FIG. 1 according to some aspects of the inventive concept.

FIG. 3 depicts another (back) view of the brewing system shown in FIG. 1 according to some aspects of the inventive concept, opposite that shown in FIG. 2.

FIG. 4 depicts another (first side) view of the brewing system shown in FIG. 1 according to some aspects of the inventive concept.

FIG. 5 depicts another (second side) view of the brewing system shown in FIG. 1 according to some aspects of the inventive concept, opposite that shown in FIG. 4.

FIG. 6 depicts a top view of the brewing system shown in FIG. 1 according to some aspects of the inventive concept.

FIG. 7 depicts a bottom view of the brewing system shown in FIG. 1 according to some aspects of the inventive concept.

FIG. 8 depicts an expanded view of a transparent boil kettle (C) of the brewing system according to some aspects of the inventive concept.

FIG. 9 depicts another expanded view of the transparent boil kettle (C) shown in FIG. 8 of the brewing system according to some aspects of the inventive concept.

FIG. 10 depicts an expanded view of a transparent mash/lauter tun (E) of the brewing system according to some aspects of the inventive concept.

FIG. 11 depicts another expanded view of the transparent mash/lauter tun (E) shown in FIG. 10 of the brewing system according to some aspects of the inventive concept.

FIG. 12 depicts a partial expanded view of the transparent mash/lauter tun (E) shown in FIG. 10 of the brewing system according to some aspect of the inventive concept having a bottom opening.

FIG. 13 depicts a front perspective view of the brewing system according to some aspects of the inventive concept highlighting the transparent vessels included therein.

FIG. 14 depicts another (front) view of the brewing system shown in FIG. 13 according to some aspects of the inventive concept.

FIG. 15 depicts another (back) view of the brewing system shown in FIG. 13 according to some aspects of the inventive concept, opposite that shown in FIG. 14.

FIG. 16 depicts another (first side) view of the brewing system shown in FIG. 13 according to some aspects of the inventive concept.

FIG. 17 depicts another (second side) view of the brewing system shown in FIG. 13 according to some aspects of the inventive concept, opposite that shown in FIG. 16.

FIG. 18 depicts a top view of the brewing system shown in FIG. 13 according to some aspects of the inventive concept.

FIG. 19 depicts a bottom view of the brewing system shown in FIG. 13 according to some aspects of the inventive concept.

FIG. 20 depicts a transparent grist case (F), transparent mash/lauter tun (E), transparent recirculation vessel (D), transparent a boil kettle (C), a transparent hopback (B), and a transparent whirlpool (A) of a brewing system according to some aspects of the inventive concept, including more particular features of the transparent recirculation vessel (D).

FIG. 21 depicts another (front) view of the brewing system shown in FIG. 20 according to some aspects of the inventive concept.

FIG. 22 depicts another (back) view of the brewing system shown in FIG. 20 according to some aspects of the inventive concept, opposite that shown in FIG. 21.

FIG. 23 depicts another (first side) view of the brewing system shown in FIG. 20 according to some aspects of the inventive concept.

FIG. 24 depicts another (second side) view of the brewing system shown in FIG. 20 according to some aspects of the inventive concept, opposite that shown in FIG. 23.

FIG. 25 depicts a top view of the brewing system shown in FIG. 20 according to some aspects of the inventive concept.

FIG. 26 depicts a bottom view of the brewing system shown in FIG. 20 according to some aspects of the inventive concept.

FIG. 27 depicts an expanded view of the transparent recirculation vessel (D) of the brewing system shown in FIG. 20 according to some aspects of the inventive concept.

DETAILED DESCRIPTION

Figure 1:
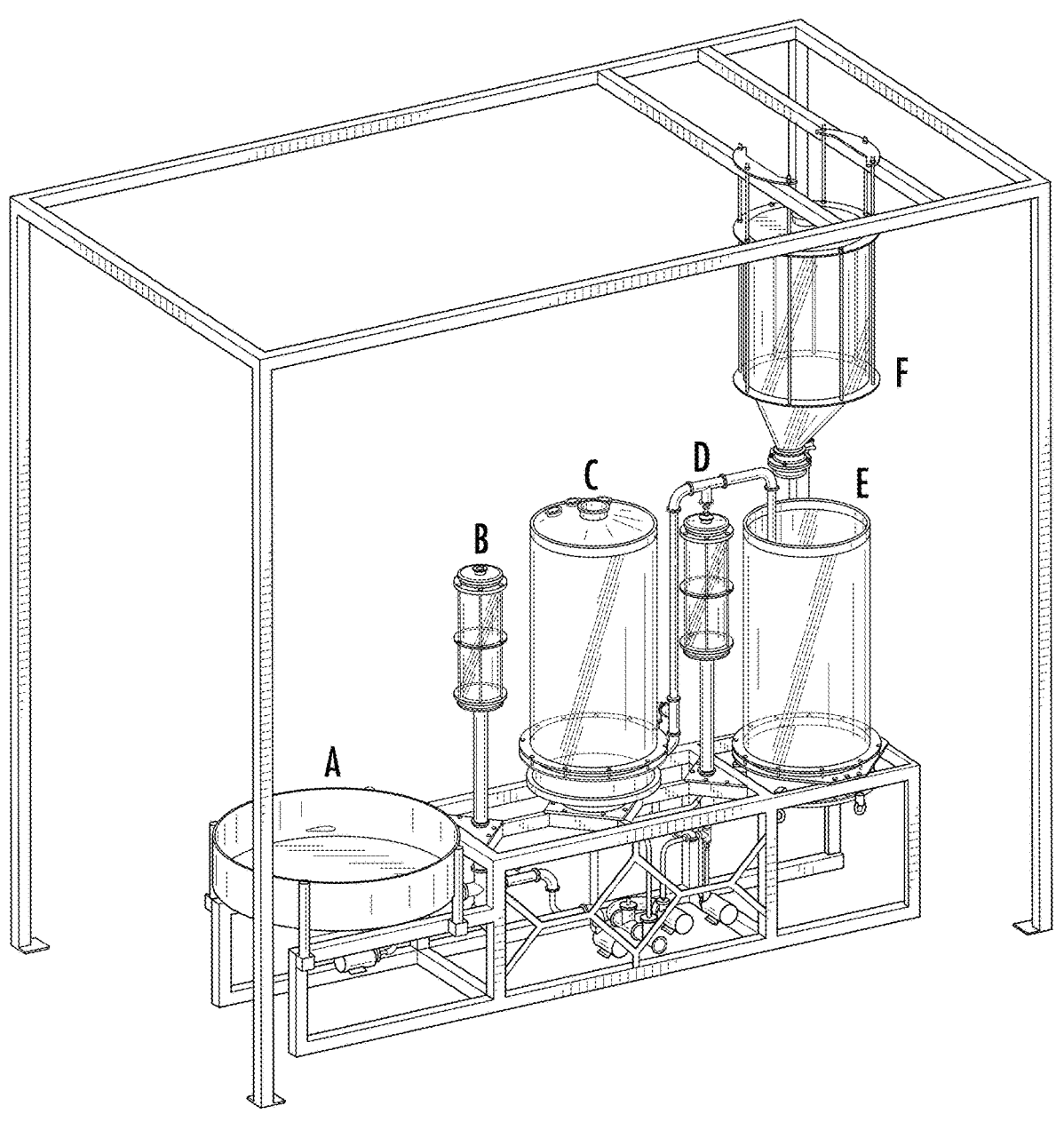
FIGS. 1-27 provide illustrations of exemplary embodiments of the present inventive concept. These accompanying drawings are not necessarily drawn to scale, and elements shown in broken lines are elements that may be present but are necessarily required as aspects of the inventive concept.
Figure 2:
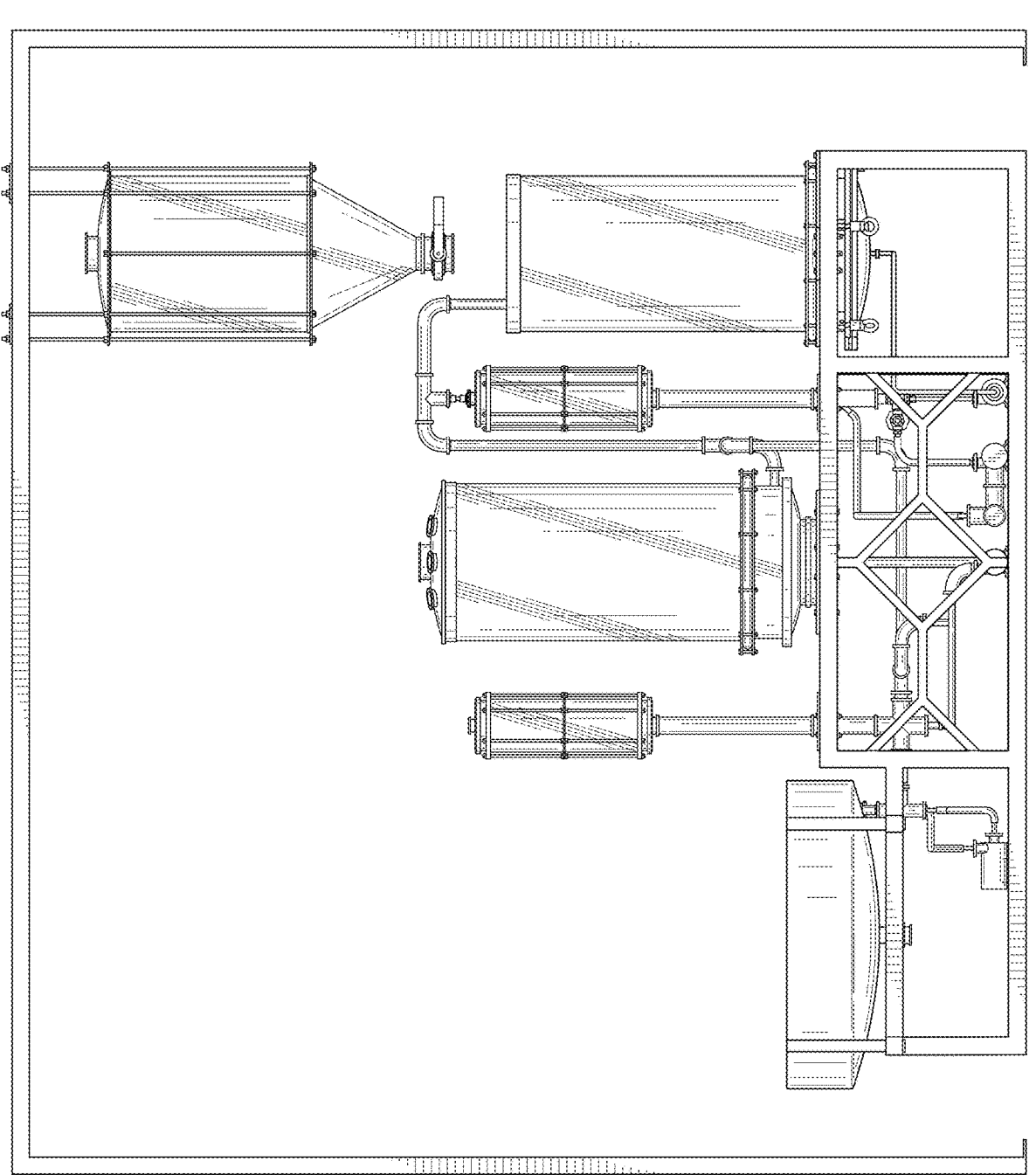
Figure 3:
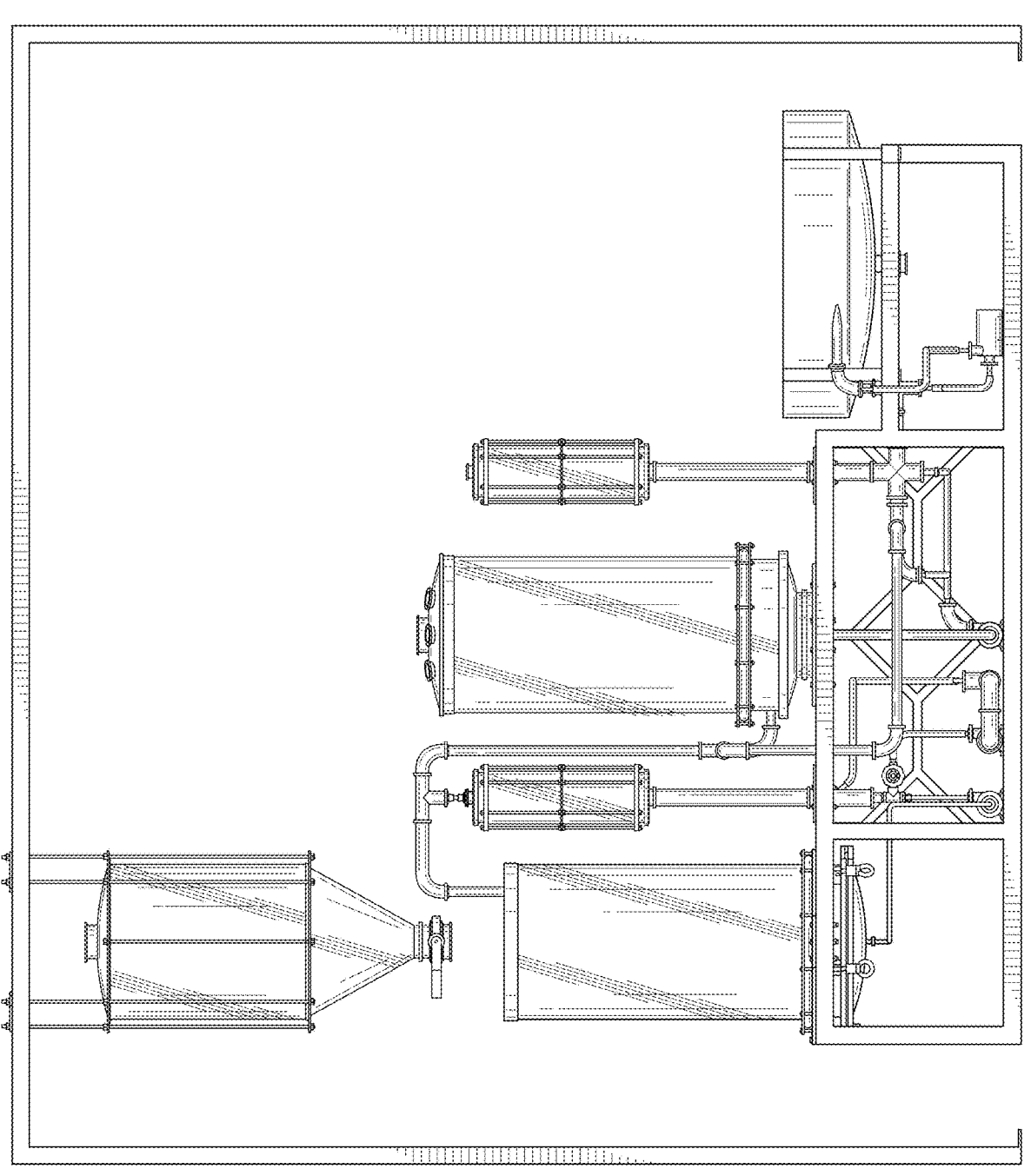
Figure 4:
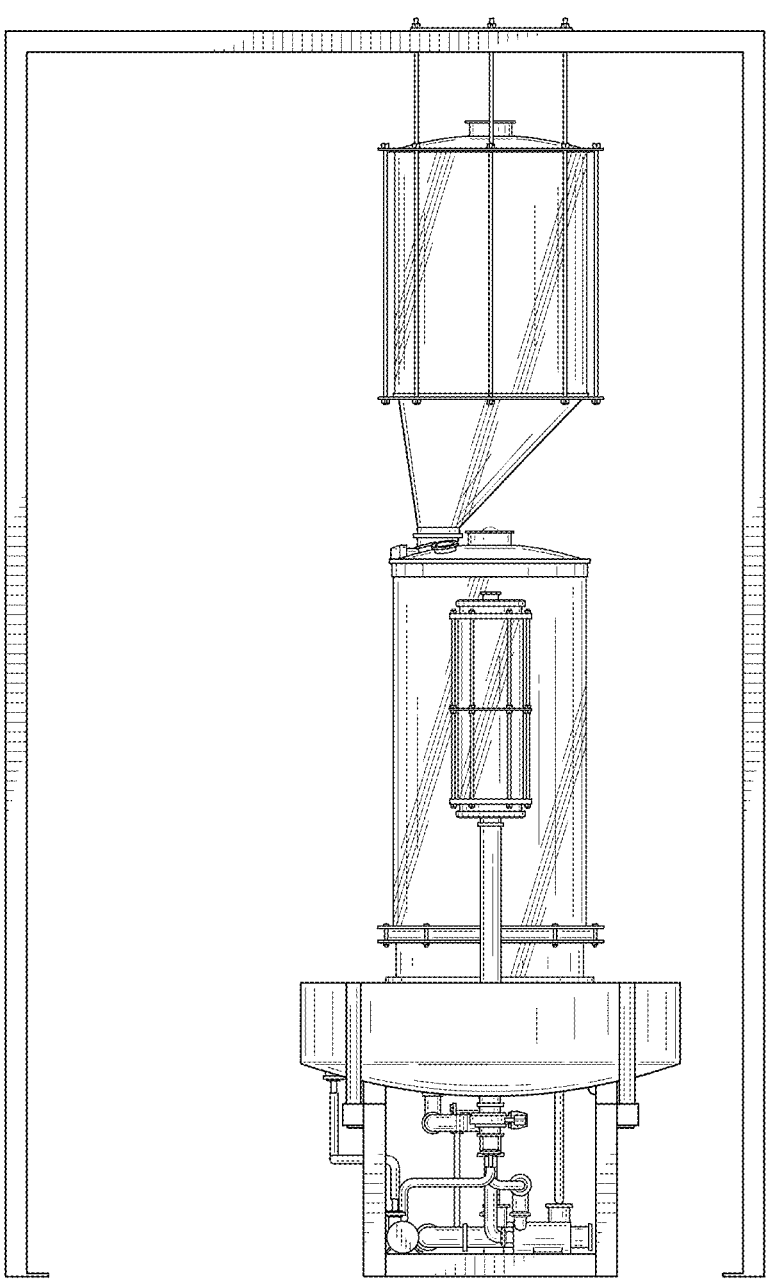
Figure 5:
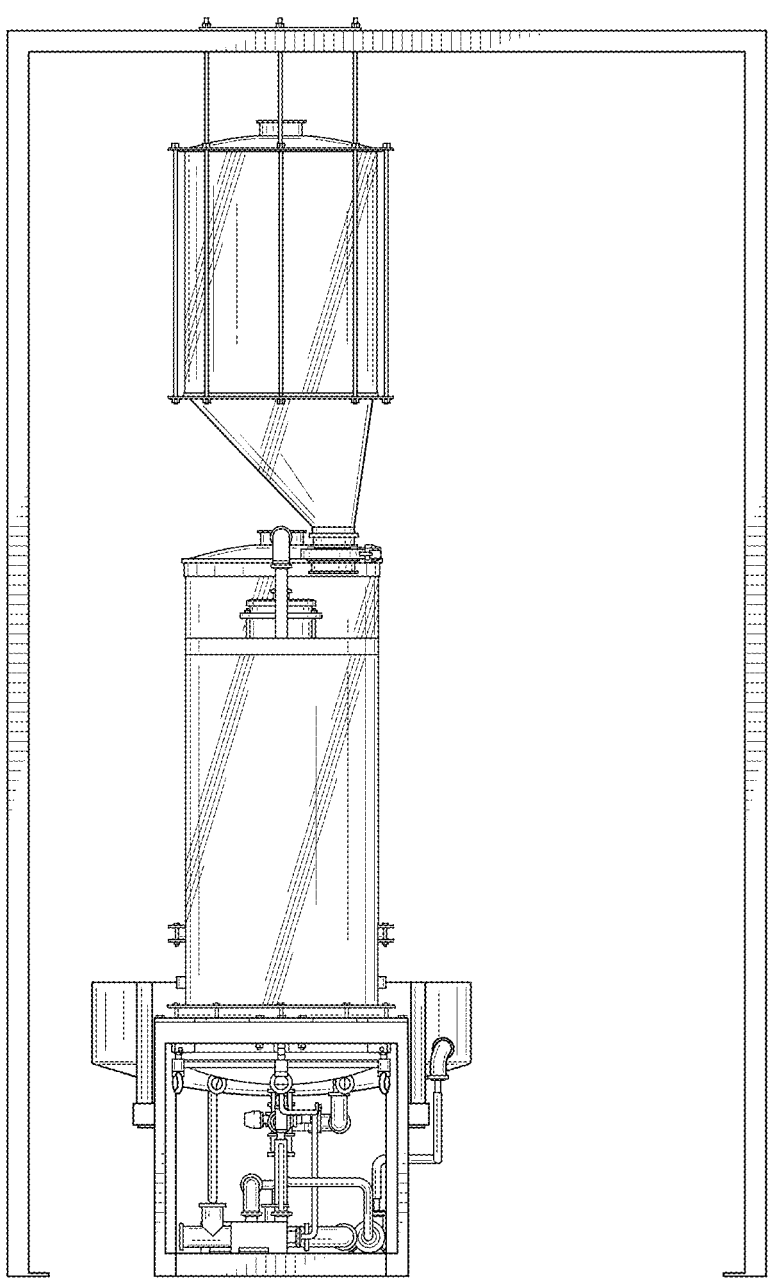
Figure 6:
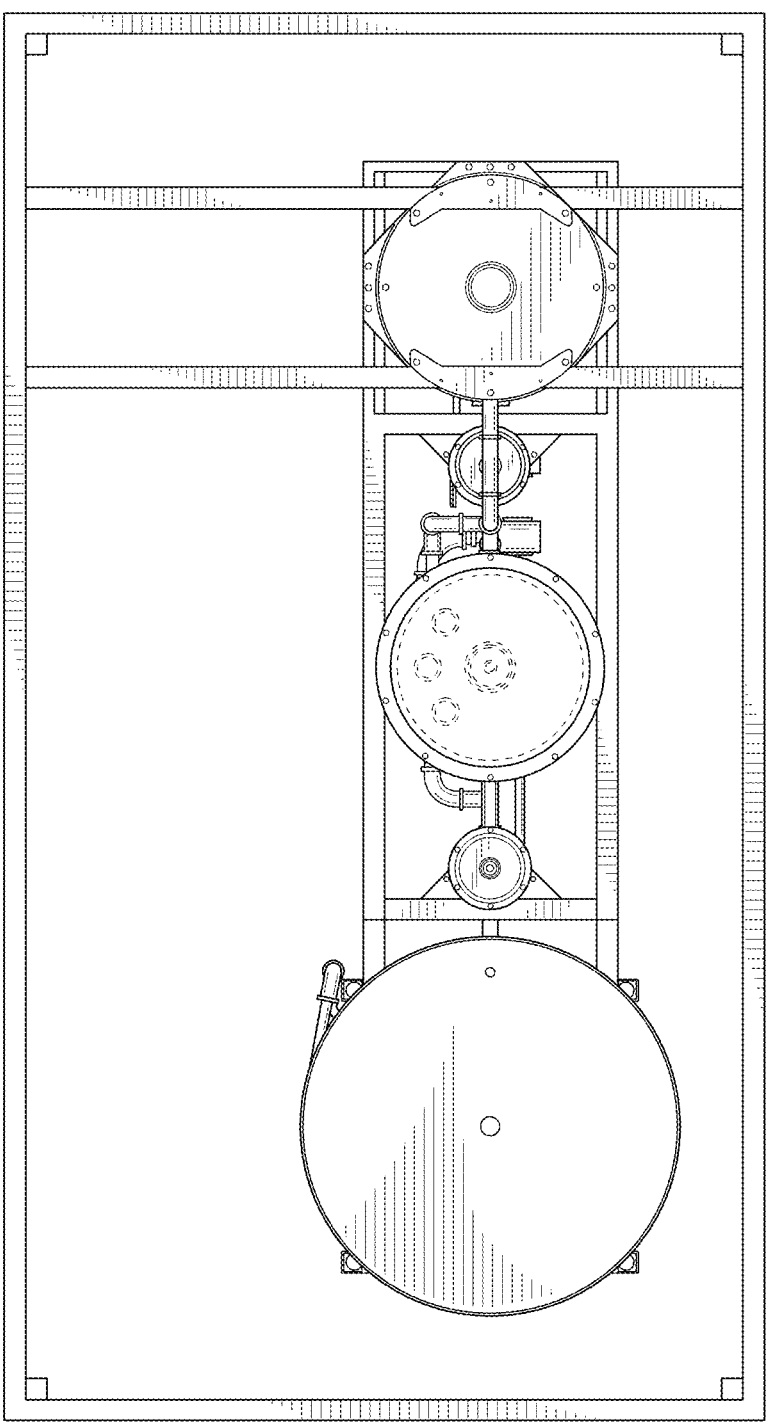
Figure 7:
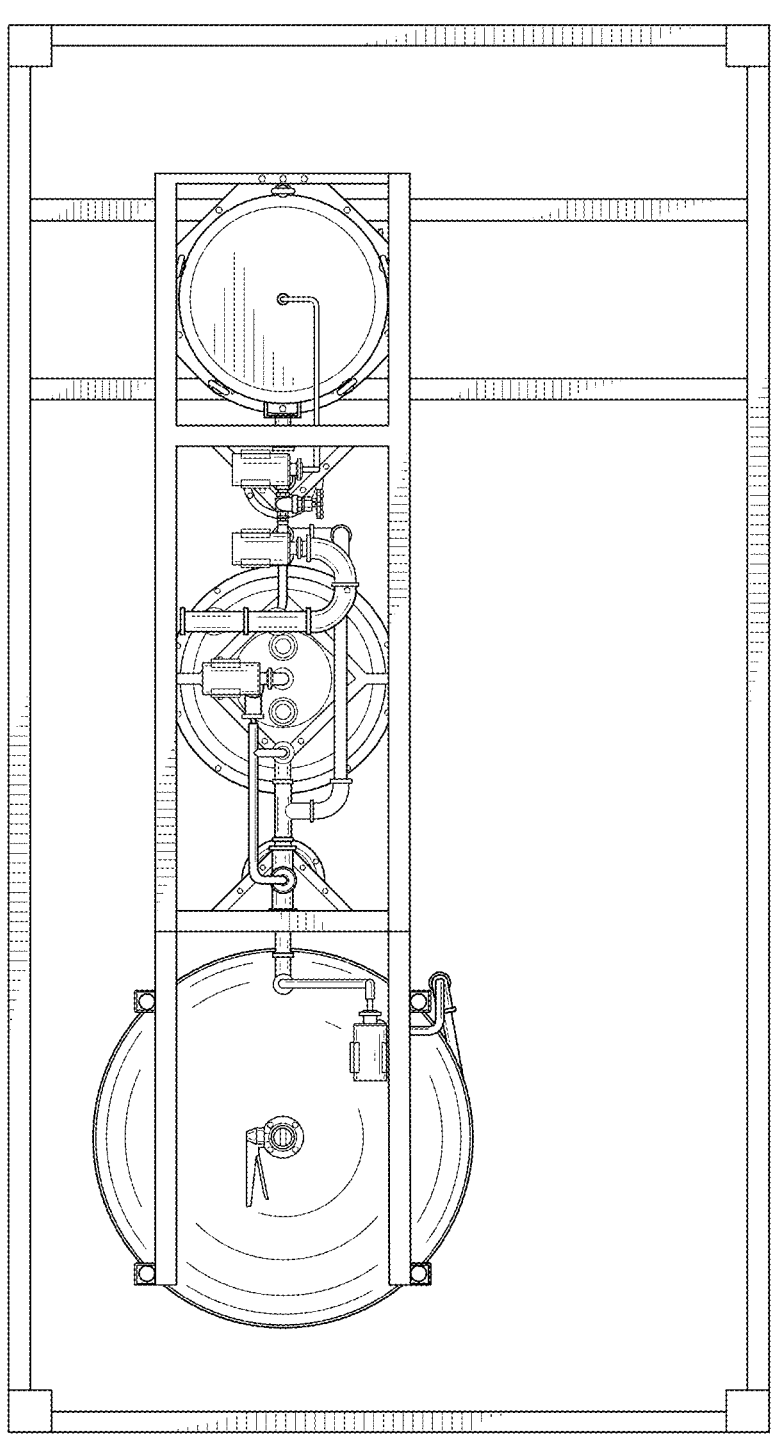

The presently disclosed subject matter now will be described more fully hereinafter with reference to the accompanying drawings, in which some, but not all embodiments of the presently disclosed subject matter are shown. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Additionally, as used herein, the term "and/or" includes any and all combinations of one or more of the associated listed items and may be abbreviated as "/".

Unless otherwise defined, all technical terms used herein have the same meaning as commonly understood by one of ordinary skill in the art to which this disclosure belongs.

The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

As used herein the term "comprising" or "comprises" is used in reference to compositions, methods, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

It will also be appreciated that the term "comprise," as used herein, may also include, and, in some embodiments, may specifically refer to the expressions "consist essentially of" and/or "consist of." Thus, the expression "comprise" can also refer to embodiments, wherein that which is claimed "comprises" specifically listed elements does not include further elements, as well as embodiments wherein that which is claimed "comprises" specifically listed elements may and/or does encompass further elements, or encompass further elements that do not materially affect the basic and novel characteristic(s) of that which is claimed. For example, that which is claimed, such as a system and/or process "comprising" specifically listed elements also encompasses, for example, a system and/or process "consisting of," i.e., wherein that which is claimed does not include further elements, and, for example, a system and/or process "consisting essentially of," i.e., wherein that which is claimed may include further elements that do not materially affect the basic and novel characteristic(s) of that which is claimed.

"About," as used herein, is intended to qualify the numerical values which it modifies, denoting such a value as variable within a margin of error. When no particular margin of error, such as a standard deviation to a mean value given in a chart or table of data, is recited, the term "about" should be understood to mean that range which may encompass, for example, +20%, +15%, or +10%, and in some embodiments, +5%, +3%, or +2%, of the recited value and the range is included.

The present inventive concept provides a brewing system and/or a brewing process wherein the majority, i.e., greater than 50%, about 60%, about 70%, about 80%, or even about 90% of the brewing vessels are transparent. In some embodiments, all of the brewing vessels, such as the brewing vessels as described herein, of the brewing system and/or brewing process of the inventive concept are transparent. In some embodiments, the brewing process relates to the production of alcohol. In some embodiments, the brewing process relates to the production of a beverage, for example, the production of beer, wine, coffee, tea, kombucha, water kefir, and/or ginger beer, and the like. In some embodiments, the beverage is a fermented beverage, for example, beer or wine. In some embodiments, the beverage is beer.

Figure 8:
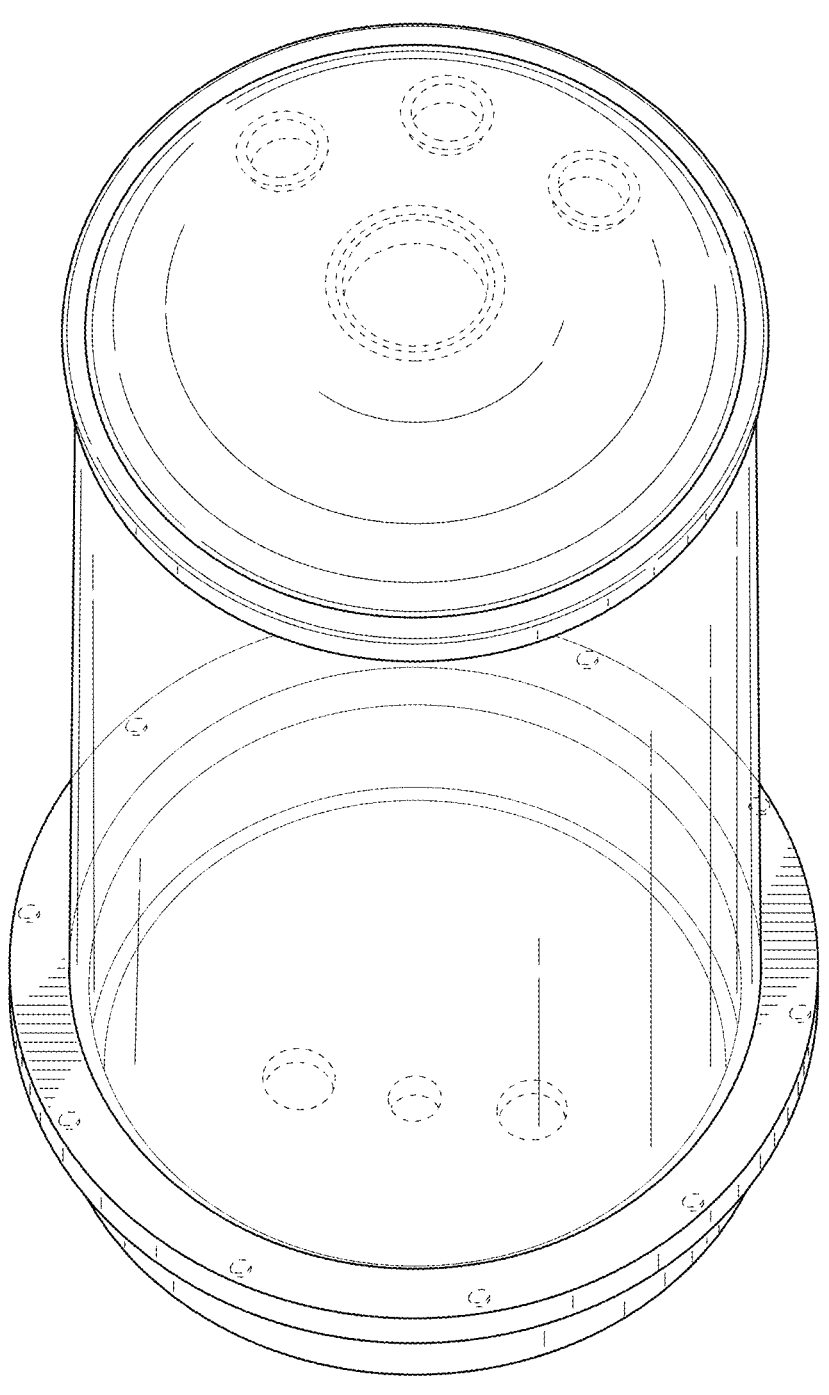
Figure 9:
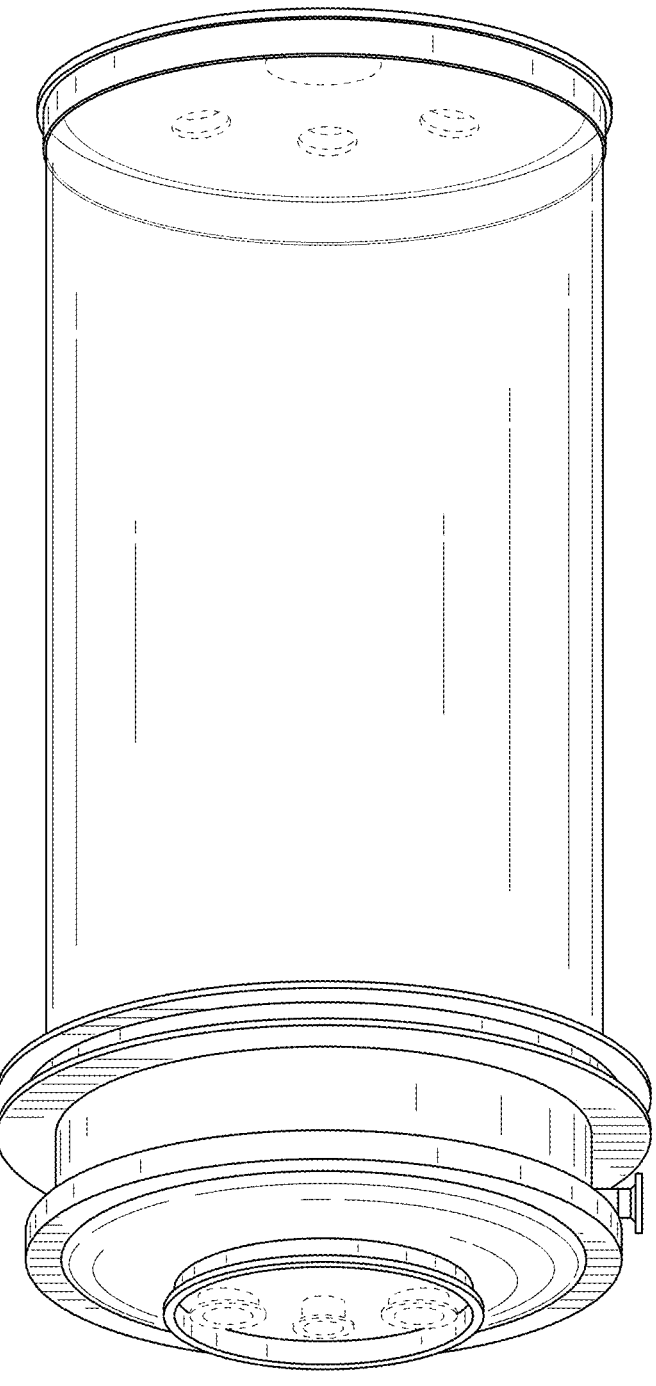
Figure 10:
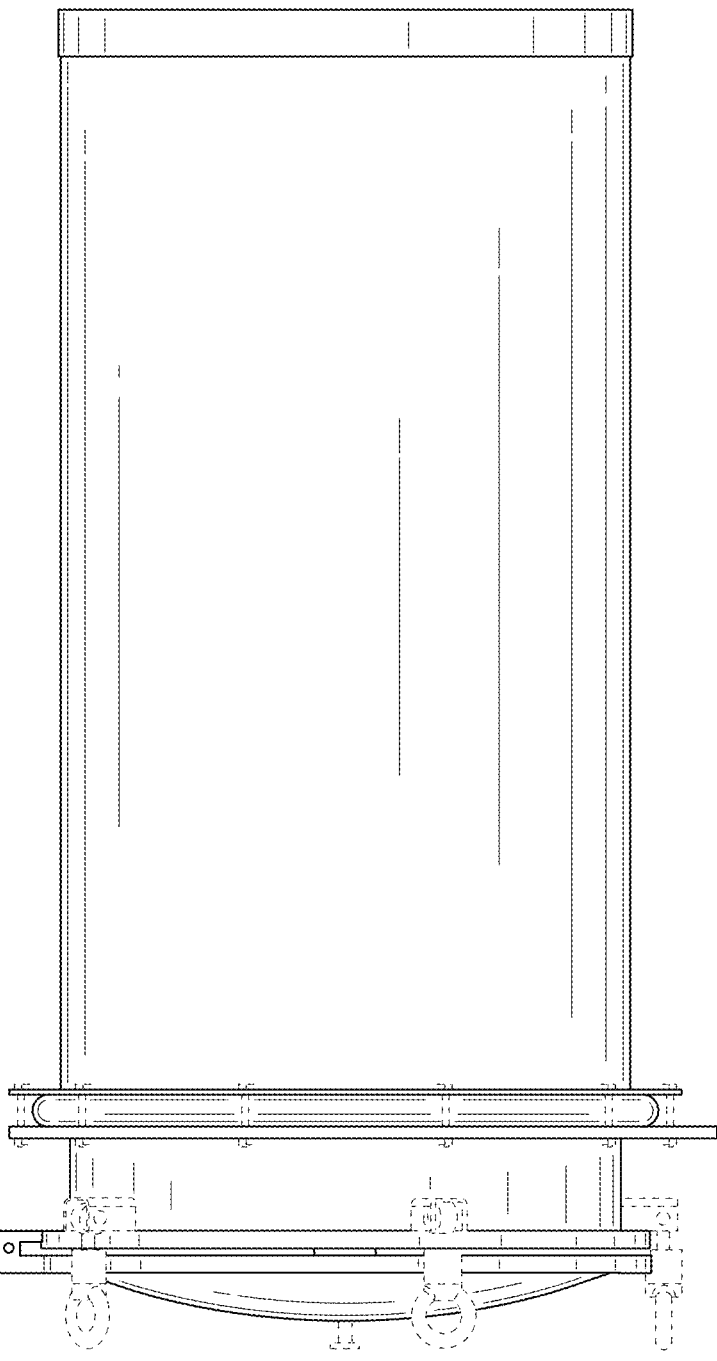
Figure 11:
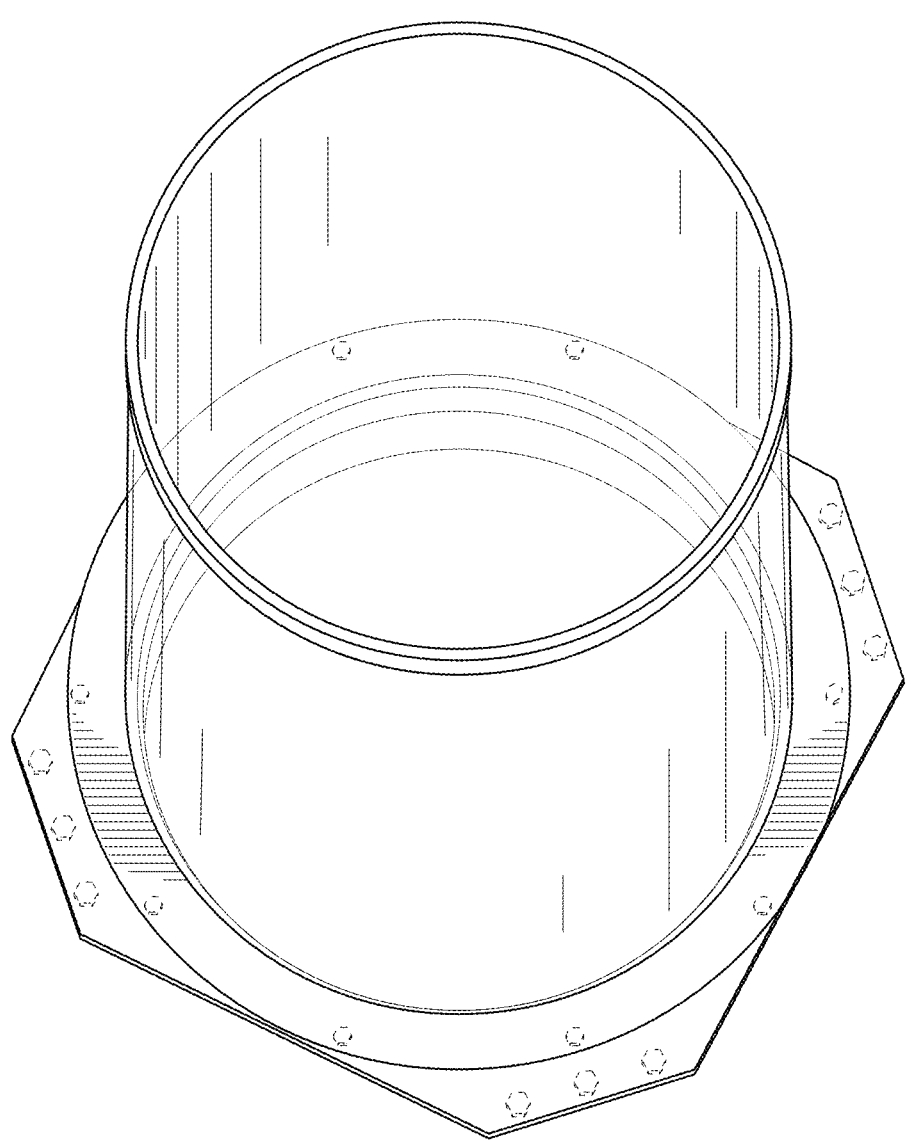
Figure 12:
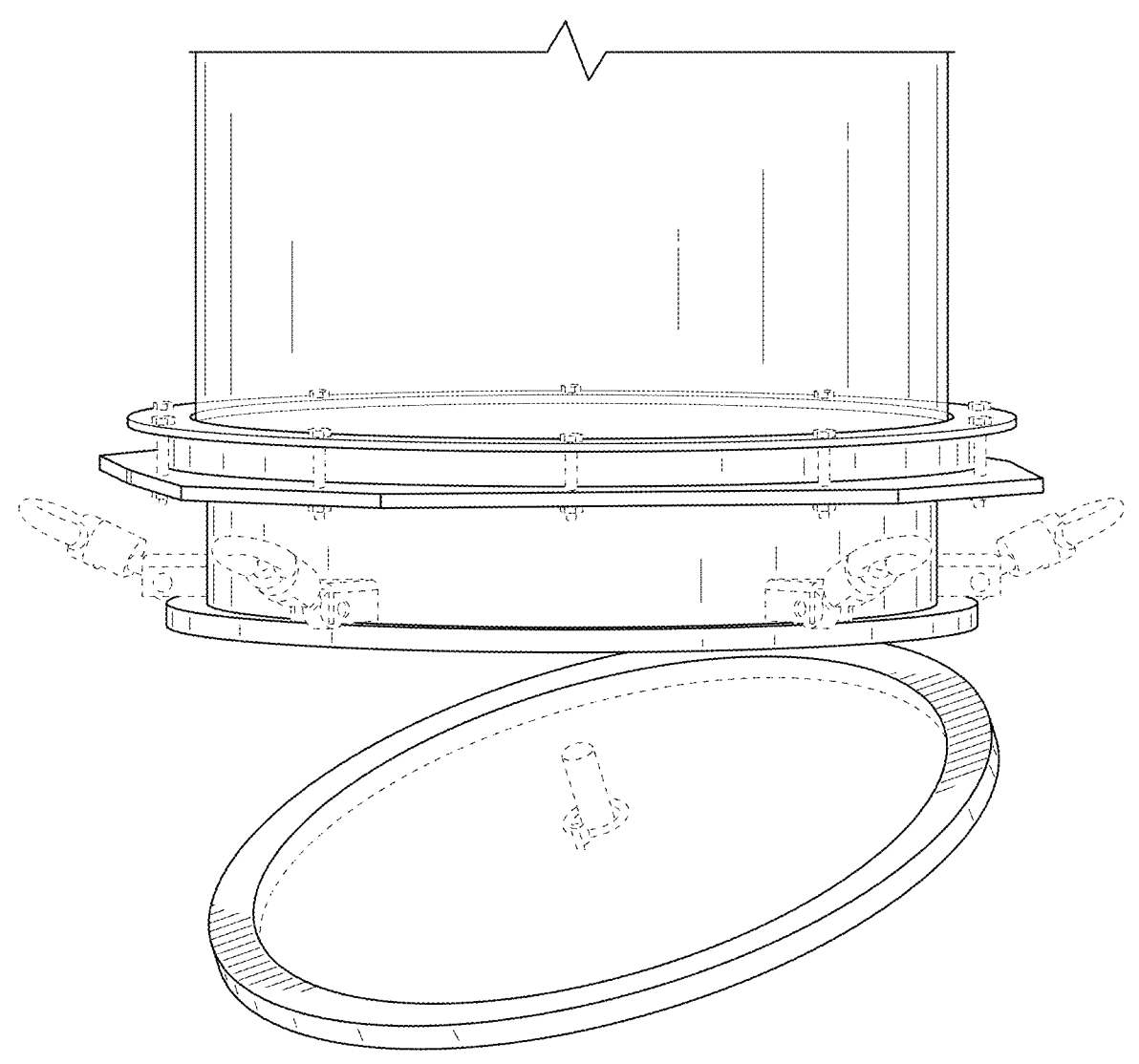
Figure 13:
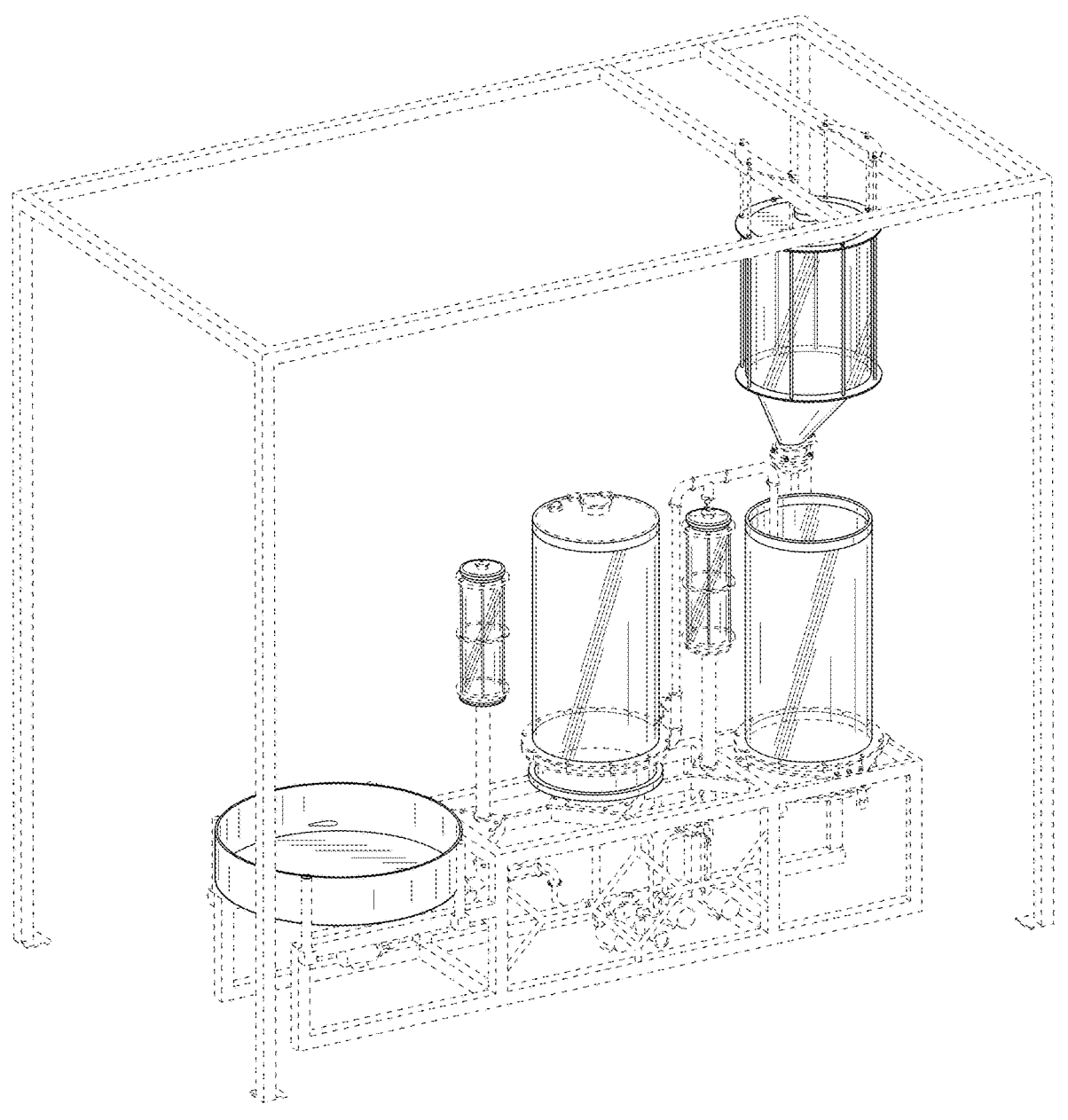
Figure 14:
Figure 15:
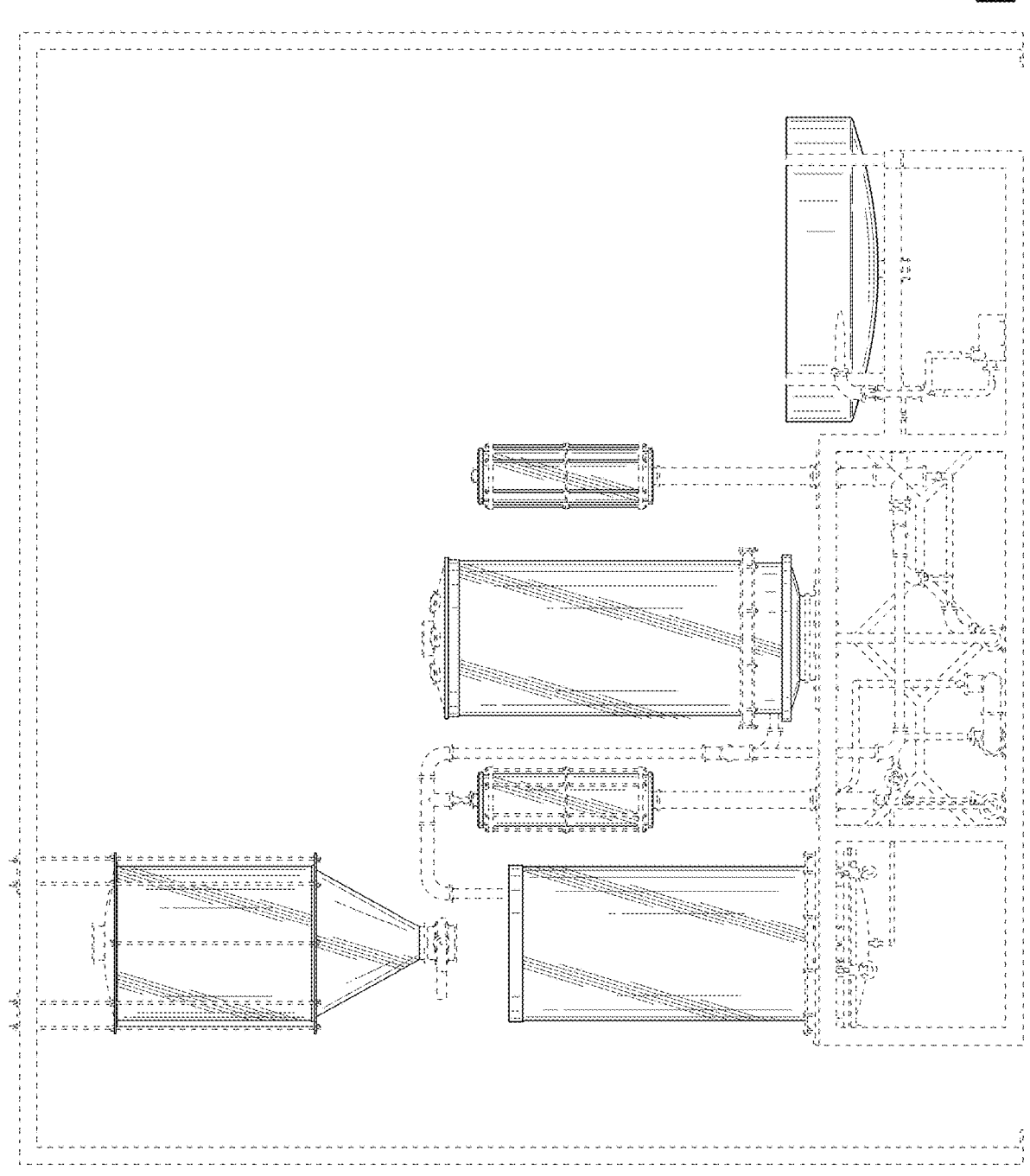
Figure 16:
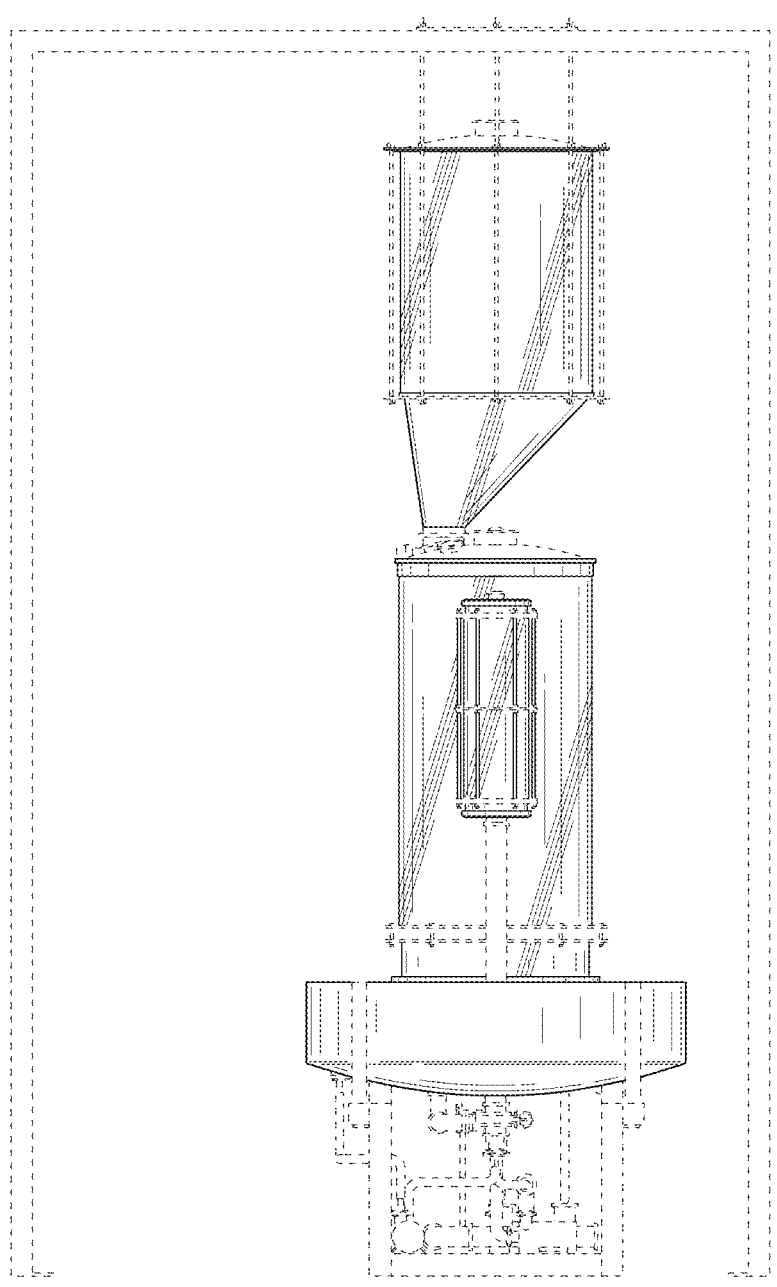
Figure 17:
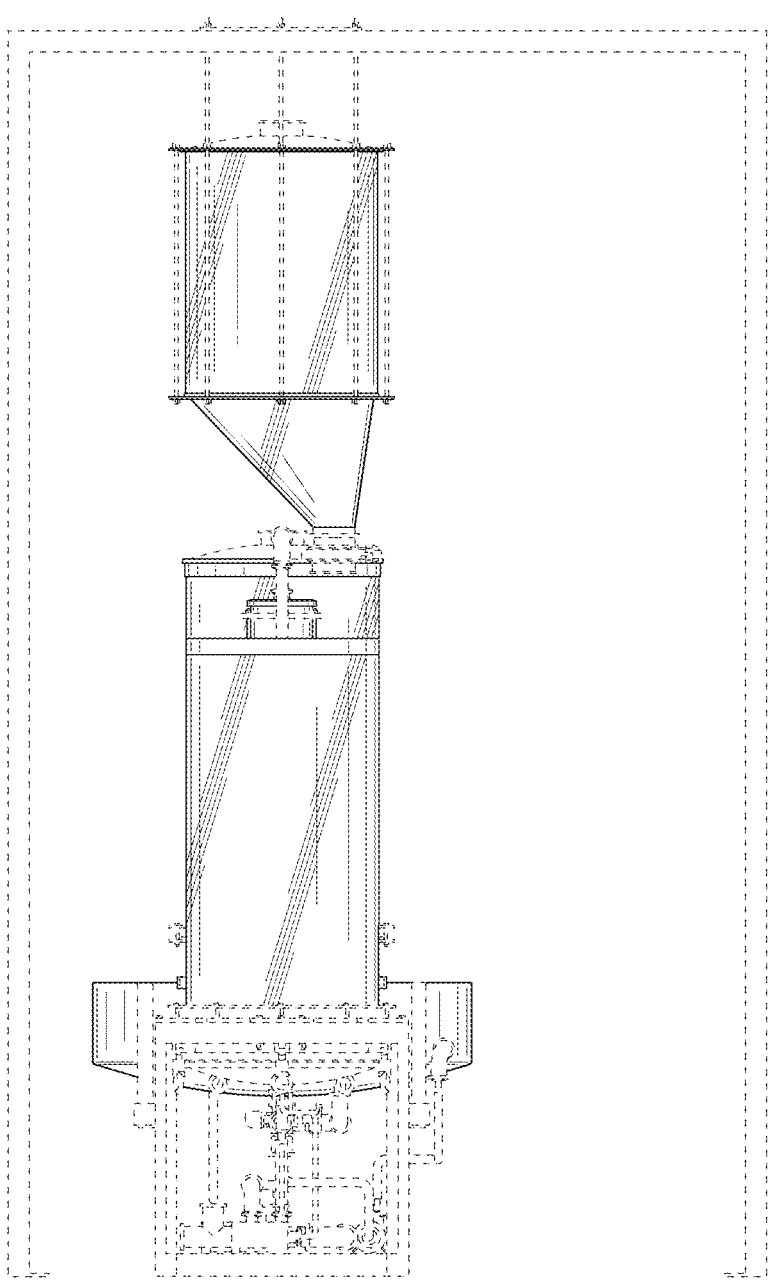
Figure 18:
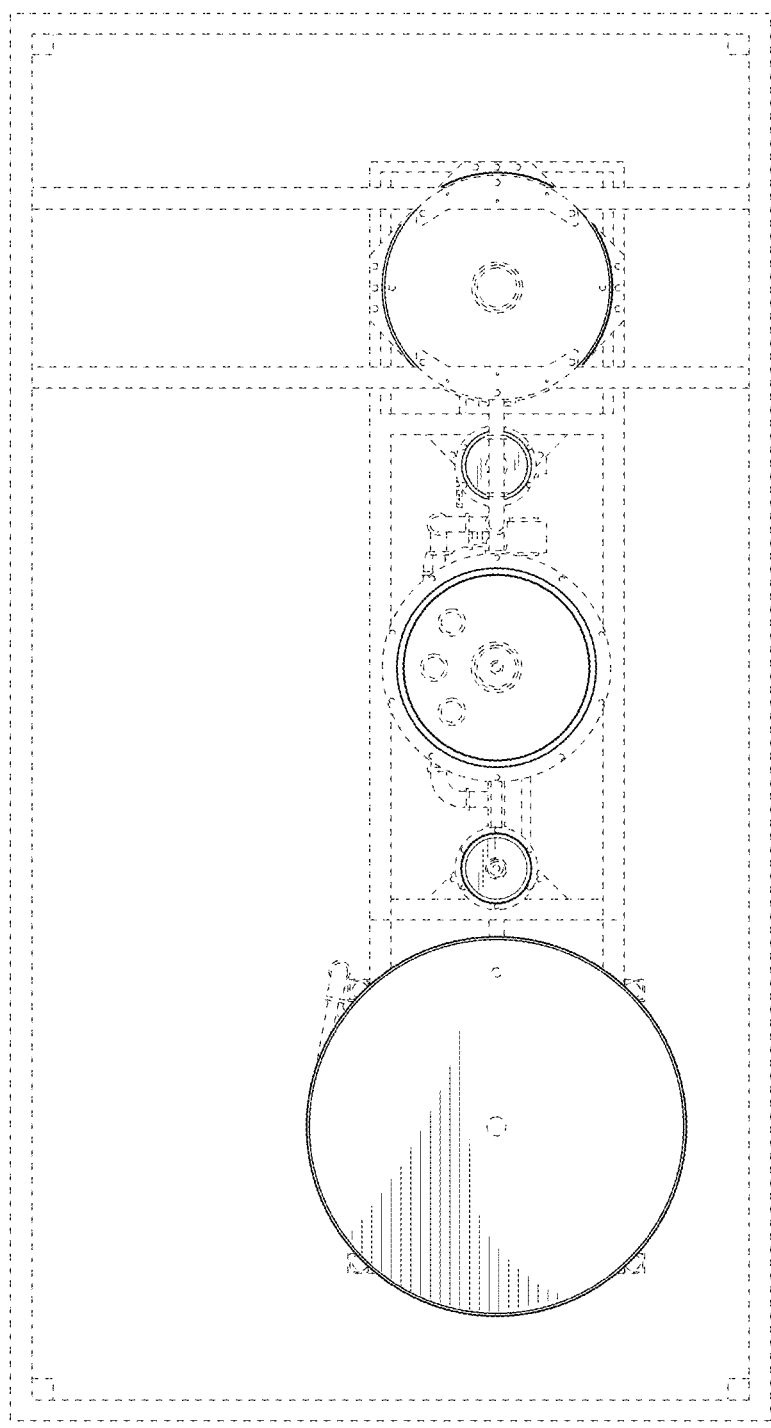
Figure 19:
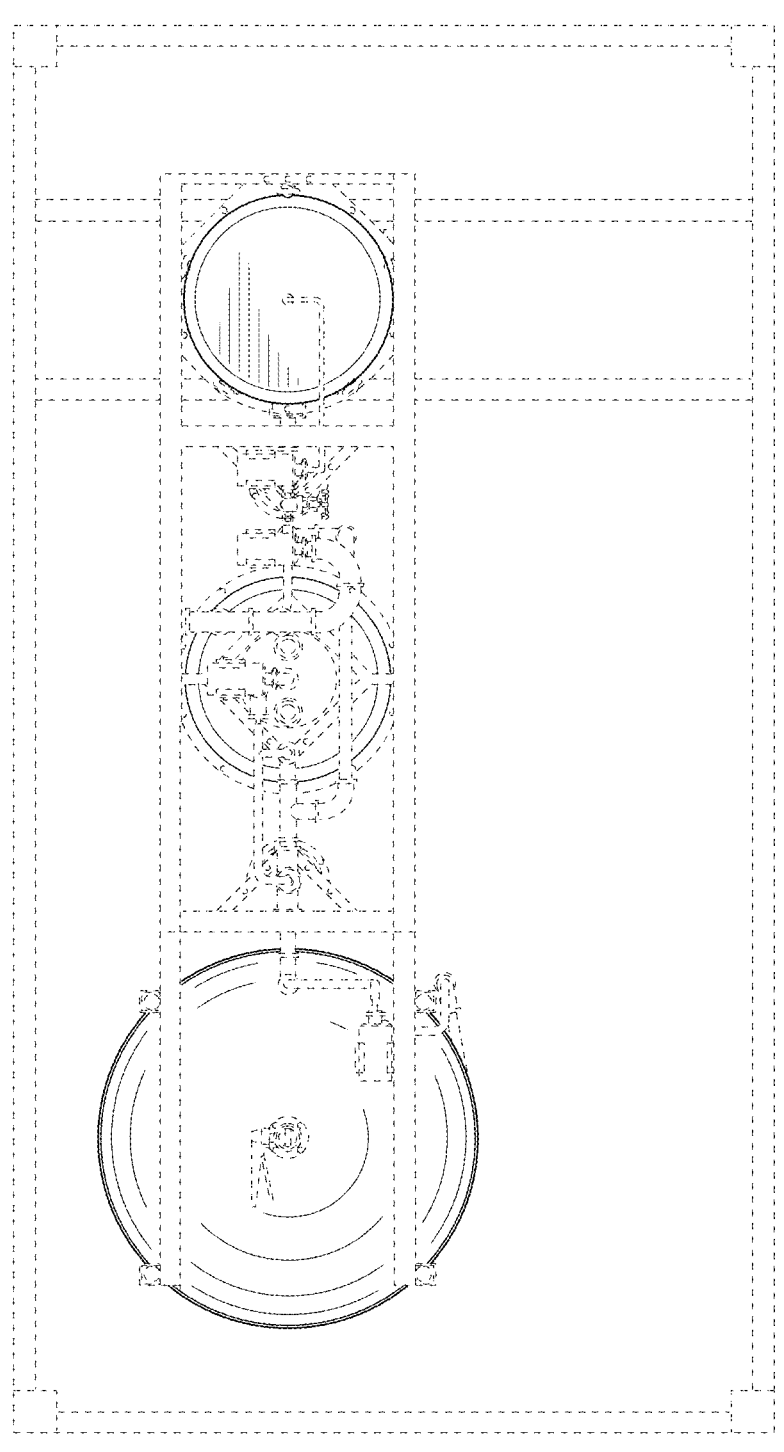
Figure 20:
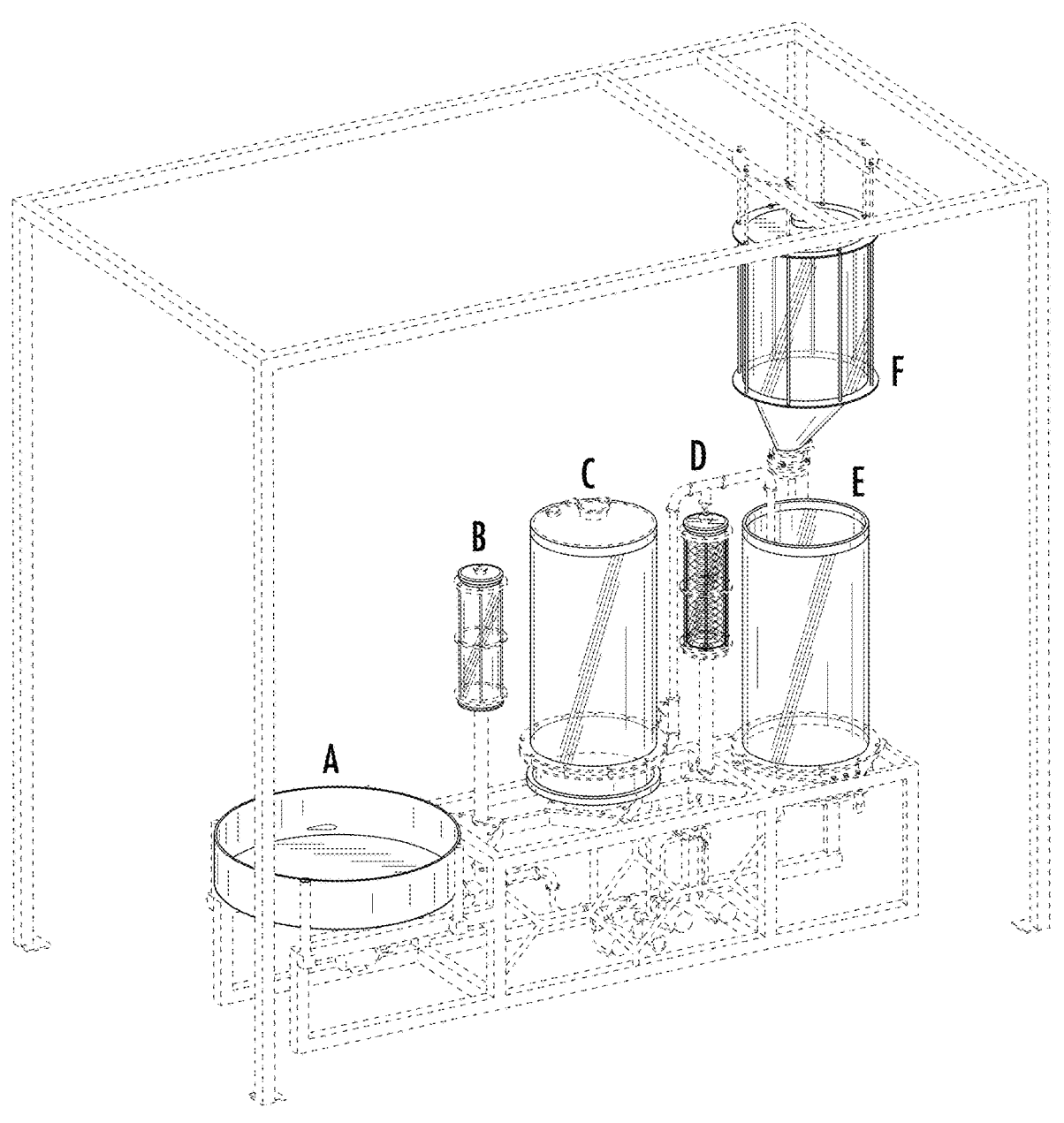
Figure 21:
Figure 22:
Figure 23:
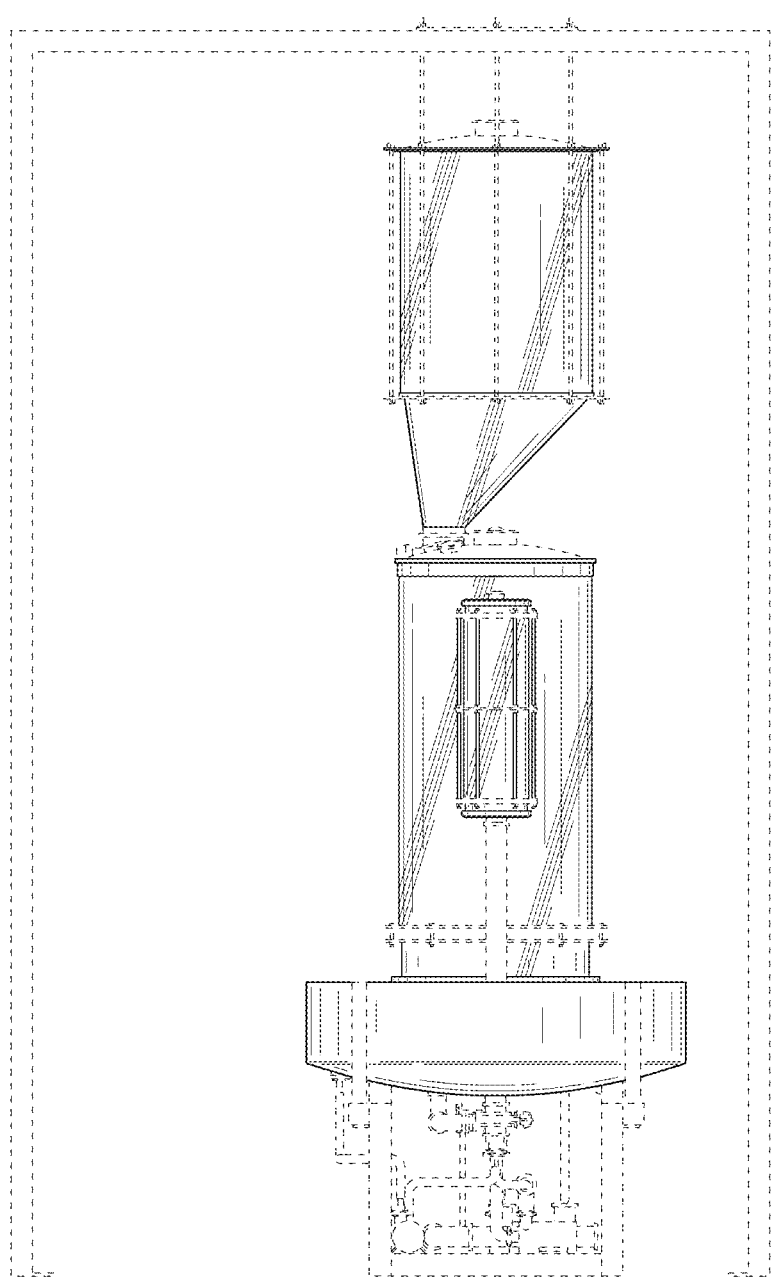
Figure 24:
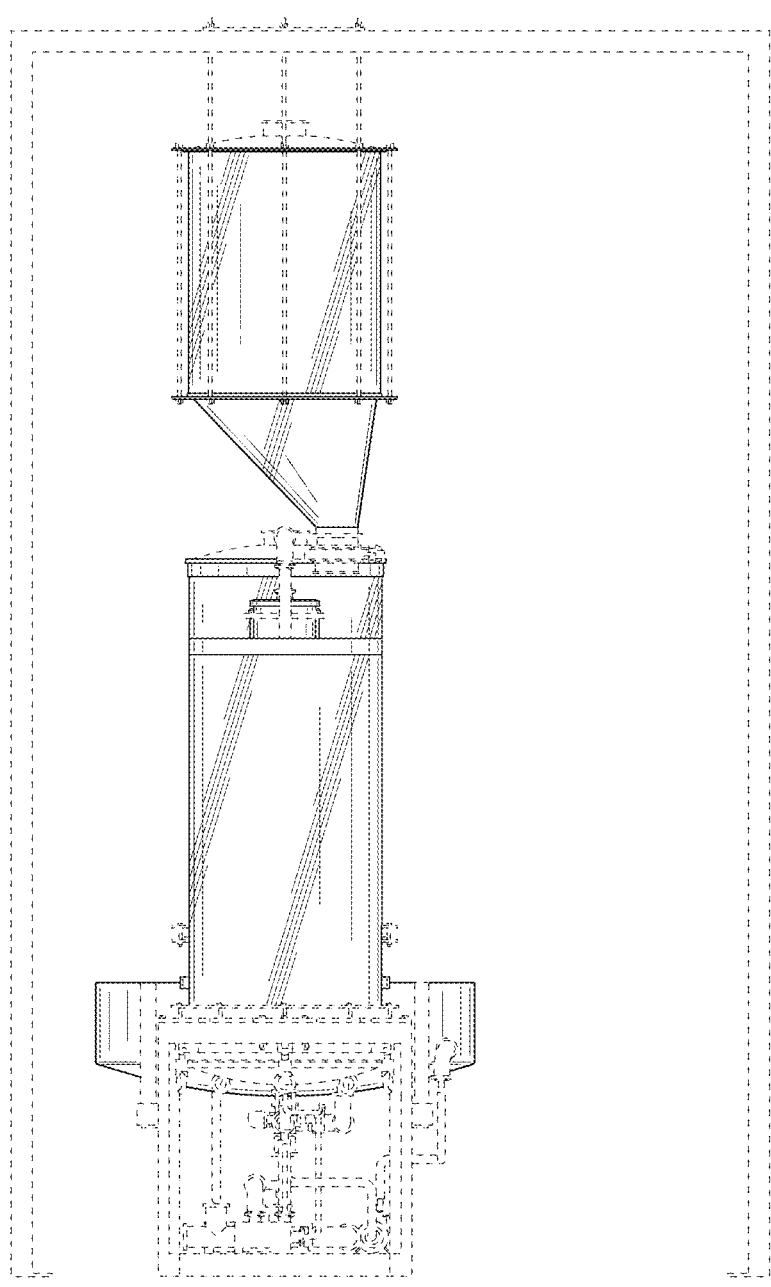
Figure 25:
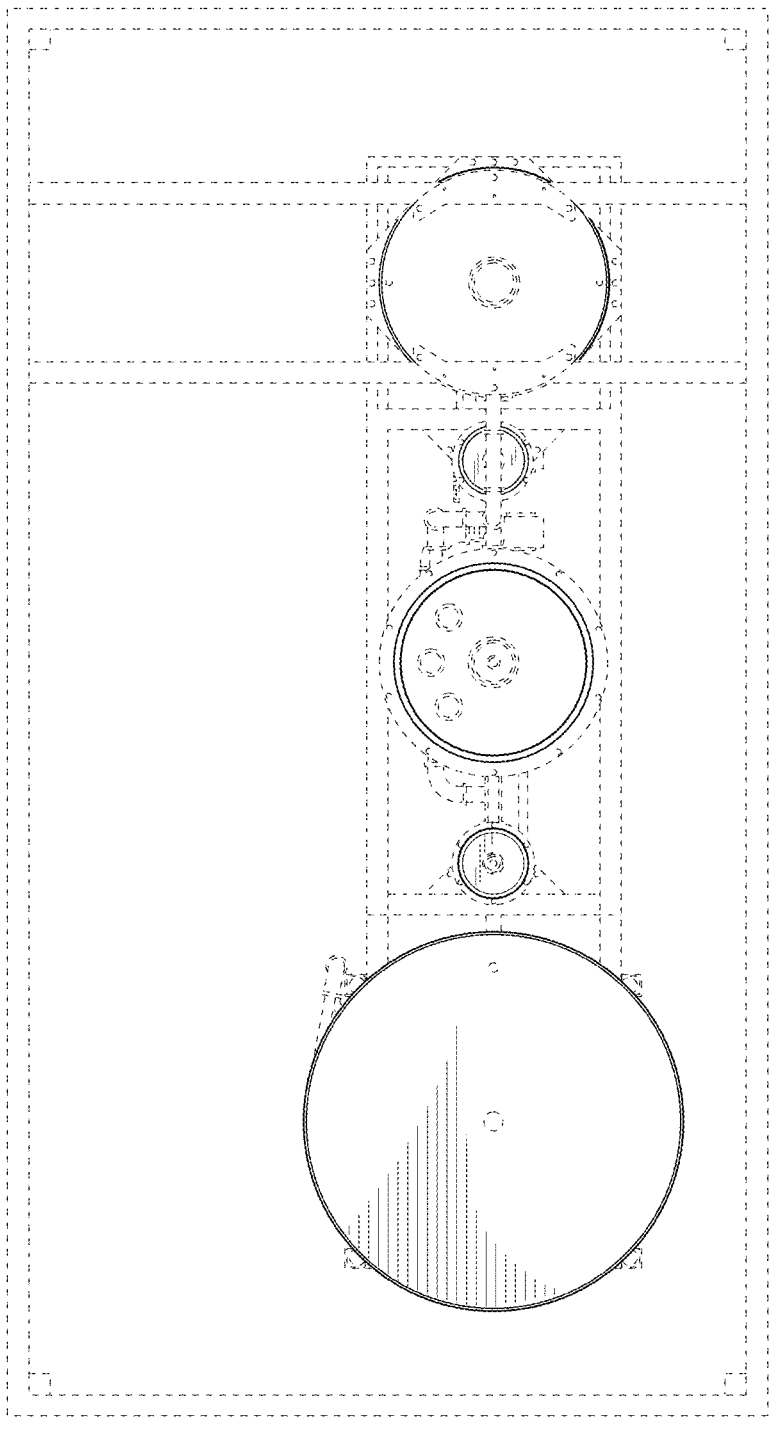
Figure 26:
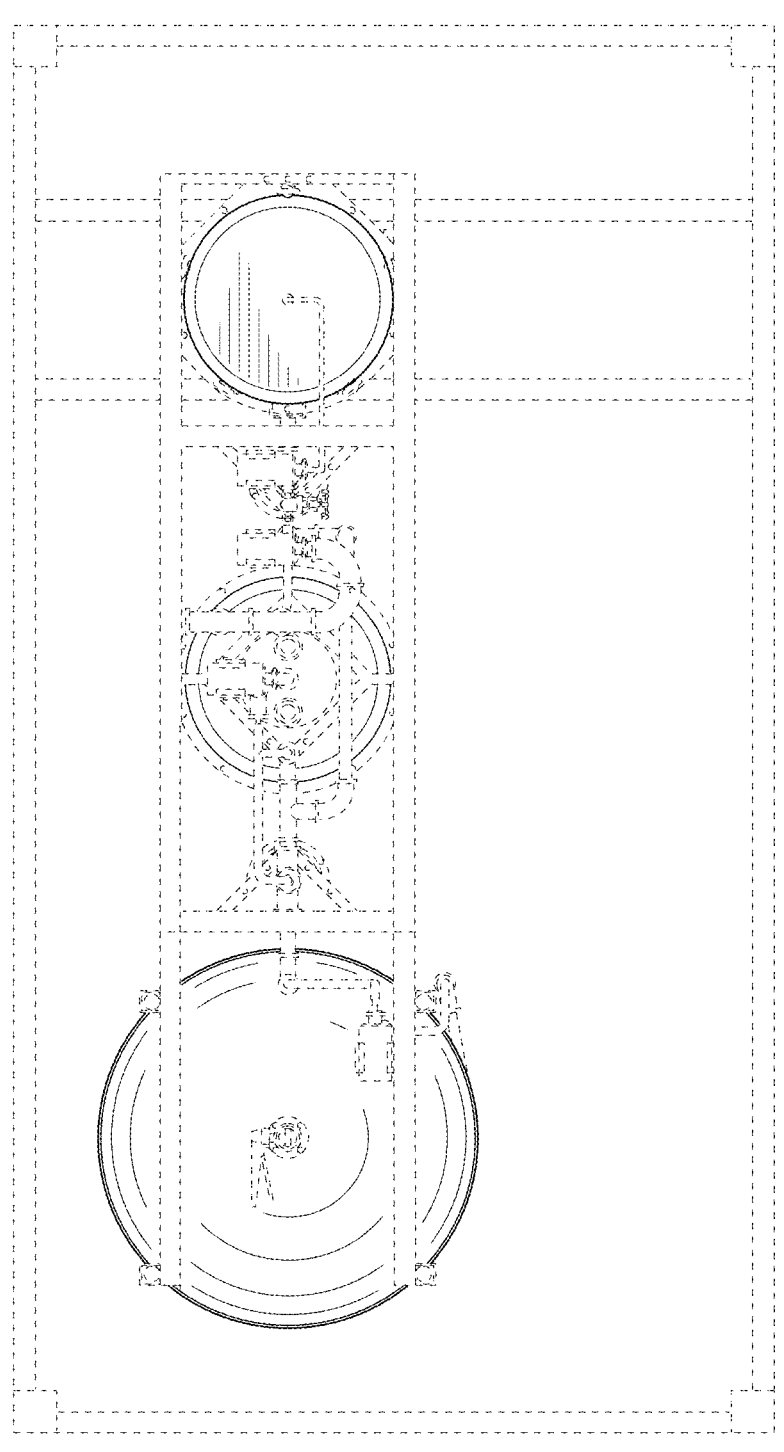
Figure 27:
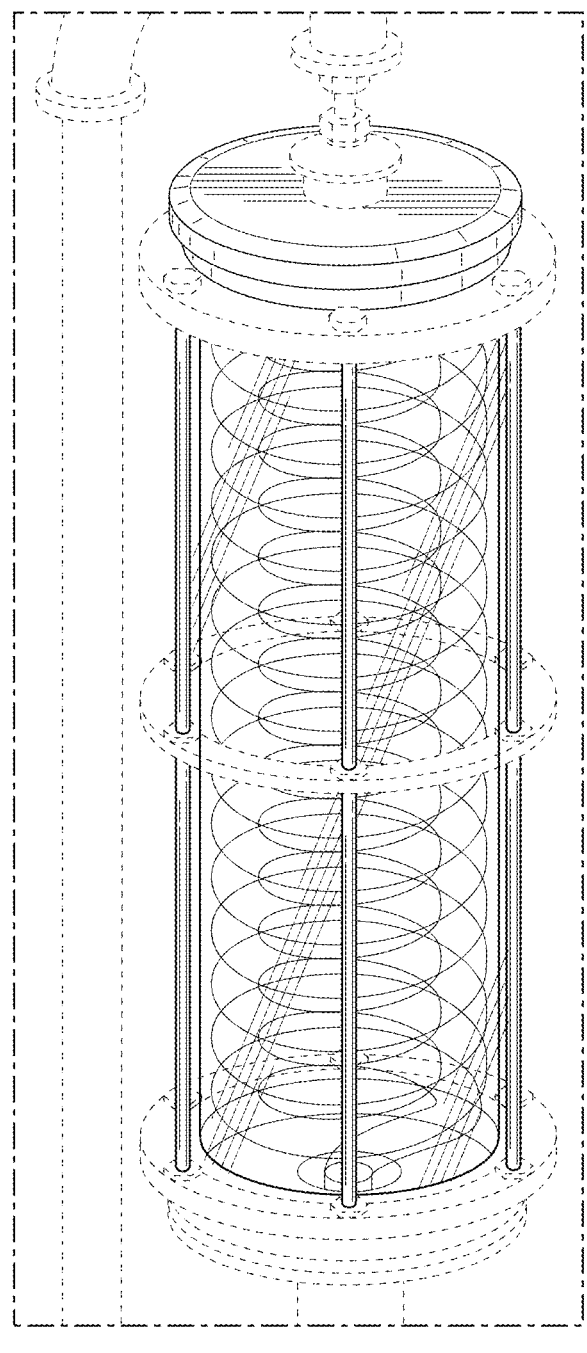

According to some embodiments of the present inventive concept, and as depicted in FIGS. 1-27, the brewing vessels of the brewing system, being uniquely clear with 360 degrees, or substantially 360 degrees of visibility, allows the brewing process to be demonstrated in a new and useful way. These brews can further be fermented in a clear fermenter/fermenters, which allows maximum control of variables and full view of the fermentation process. These brewing vessels that may be included in the brewing system of the inventive concept can be, in order of use in the process, for example, a grist case, a mash/lauter tun, a recirculation chamber, a boil kettle, a hopback, a whirlpool, followed by a heat exchanger, and/or a fermenter/fermenters, wherein each vessel may offer unique insight into its respective role in the process. In some embodiments, the brewing system of the inventive concept may include: any one of; any combination of without limitation; or all of the following:

A Transparent Grist Case, e.g., (F) as shown in FIG. 1 and FIG. 20-which affords viewers and/or consumers a full view of the grains (often a primary ingredient in beer) that are to be used in each specific recipe of a beverage prepared by the brewing system and/or process of the inventive concept;

A Transparent Mash/Lauter Tun (MLT), e.g., (E) as shown in FIG. 1 and FIG. 20, and further detailed in FIGS. 10-12—the vessel where the grains are broken down by enzymes and the color, flavor, and sugars of the grains are literally extracted. This process is twofold. The "Mashing" is the process where we target a temperature and a water to grain ratio for a "rest" period. This consistency and the transformation from water and grain to "wort" or a "sweet wort" may be put on display with the transparent MLT and soon the color and aromas will begin to be solubilized. The lauter is the process where we essentially rinse the grains of this liquified extract and leave behind the solids. This vessel does both functions. Viewers and/or consumers may watch as the rinse water trickles through the grain and slowly becomes lighter and clearer;

A Transparent Recirculation vessel, e.g., (D) as shown in FIG. 1 and FIG. 20, and further detailed in FIG. 27—This vessel is the component that makes the uninsulated mash/ lauter tun feasible. It may contain a transparent water bath set to a specific temperature. Inside the water bath may be a transparent coil, e.g., as detailed in FIG. 27 and as shown in FIGS. 20-27, through which the liquid from the MLT will run and absorb heat from the water bath within the recirculation vessel in order to maintain a specified temperature. During the lauter, this vessel will also preheat the wort entering the boil kettle in order to efficiently begin the boiling process. In-line temperature and pH readings will allow viewers to understand how this liquid transforms over the course of the Rest;

A Transparent Boil Kettle e.g., (C) as shown in FIG. 1 and FIG. 20, and further detailed in FIGS. 8 and 9—This vessel in its function is very simple, in which the wort/sweet wort is boiled therein. However, the transparent component makes it visually engaging and exciting as the steam and churning of the wort/sweet wort in the kettle displays the physics of the boiling process as well as the reductive impacts of evaporation, a vital part of the brewing process. Likewise, the proteins of the wort will clump up and the hazy chunky liquid that entered will leave clearer and vibrant after the boil;

A Transparent Hopback e.g., (B) as shown in FIG. 1 and FIG. 20-Hops are a vital part of the brewing process in the preparation of a beer, and one of the most well-known ingredients. A hopback allows the viewer to learn about the oils from the hops and how the oils are extracted. In form and function, this is much like a smaller MLT, in that it passes hot liquid through a solid agricultural product and leaves behind the solid matter while solubilizing the essence and flavor. It also allows the brewer to utilize the leafy vegetation to further filter out some of the stubborn proteins and solids from the boil kettle. According to some embodiments, while generally the solid agricultural product is or includes hops, however, the solid agricultural product is not limited thereto. The solid agricultural product included in the hopback may be any that is used and/or envisioned by one of skill in the art. Nevertheless, in some embodiments of the system and/or process of the inventive concept, the hopback may be omitted, for example, such as in embodiments wherein the brewing system and/or process utilizes dry hopping, such as in a process wherein any hop addition to the wort or sweet wort occurs after the wort is cooled, for example, including and adding hops to the fermenter or fermenters, or even directly to the barrel containing the final beverage product;

A Whirlpool, e.g., (A) as shown in FIG. 1 and FIG. 20—In some embodiments, the whirlpool is a low-profile whirlpool. The last stop for hot wort in the process, this vessel is low to the ground and has a uniquely open top. As the wort enters at a tangential port at velocity, the liquid begins to spin and create a whirlpool effect wherein the solids collect and settle in the center. after a few minutes, the settled wort can be pumped out of a side port and leave the settled "Trub" in the center. The viewer and/or consumer will be able to see the way the wort spins from above and at the end, all of the trub left behind, further illuminating how the wort is refined;

A Heat Exchanger—In some embodiments, the heat exchanger may be a two-stage counter-flow heat exchanger. In some embodiments, the two-stage counter-flow heat exchanger, including of large stainless steel coils, provides a clear representation of how the wort and/or sweet wort is cooled after it leaves the whirlpool and how it exchanges its heat efficiently with the cooling water that is so important for demonstrating the energy recovery efficiency of modern brewing. Large thermometers will display the wort and cooling water temperatures coming into the heat exchanger and then coming out, demonstrating the heat exchange; and/or A Transparent fermenter and/or fermenters—In the preparation of a fermented beverage, for example, a beer, fermentation is a process whereby yeast converts glucose in the wort and/or sweet wort to ethyl alcohol and carbon dioxide gas ($CO_2$) to give the beer its alcohol content and carbonation. The fermentation process starts when cooled wort is transferred to a fermenting vessel and yeast is added. Therein, yeast included in the fermenter and/or fermenters ferments the sugars in the wort/sweet wort and produces alcohol and carbon dioxide gas in a turbulent, foamy process that leads to production of beer. In some embodiments, hops may also be included in the fermenter and/or fermenters, for example, in a beverage, such as a beer that is being "dry hopped." In some embodiments, the fermenters included in the brewing system and/or used in the process of the inventive concept may include a primary fermenter and a secondary fermenter without limitation. These may be and include horizontal transparent tubes that may be, in some embodiments, optionally shielded from damaging UV rays via a transparent film wrap that also, in some embodiments, may be, optionally applied to the windows of the temperature-controlled room where they stand as well as may be, optionally applied to the outside of the vessels themselves, such as, for example, in cases where UV light may negatively affect the fermented product/beverage, such as a beer. In some embodiments, any one vessel, some of the vessels in any combination, or all of the vessels of the brewing system of the inventive concept as described herein may be placed on load cells to display how the metabolism of the yeast lightens the liquid as the mass escapes in the form of gas, drawing a unique parallel between yeast lifecycles and our own, further educating on the brewing process. Support elements of any one vessel, some of the vessels in any combination, or all of the vessels of the brewing system of the inventive concept as described herein, for example, as depicted in FIGS. 1-7, may be included in the system as described herein without departing from the scope of the inventive concept.

According to embodiments of the inventive concept, the fermentation process conducted in the fermenter and/or fermenters is not particularly limited, and may be any that may be used and appreciated by one of skill in the art using the system and/or according to the process of the inventive concept as described herein. It will be appreciated that fermentation, in the preparation of beer, may include "top" fermentation, using yeast that ferments at, for example, temperatures of about 14-30° C., and ferments at the top surface of the fermenting liquid/wort or sweet wort, or "bottom" fermentation, using yeast that ferments at, for example, temperatures of about 4-10° C., and ferments below the upper surface/at the bottom of the fermenter and/or fermenters including the fermenting liquid/wort or sweet wort.

In some embodiments, the hopback as discussed above, the load cells and/or the recirculation chamber may not be present in the brewing system and/or used in the process of the inventive concept. In some embodiments, the grist case may be omitted, and pre-milled grain may be utilized and directly added to the mash/lauter tun of the brewing system and/or used in the process of the inventive concept. In some embodiments, a transparent whirlpool may be included in the system and/or used in the process of the inventive concept.

These vessels are used in conventional brewing and function in a similar manner to those used in conventional brewing systems and processes, but by making them transparent and interactive, the present brewing system and/or used in the process of the inventive concept does much more than simply produce beer efficiently. It provides a viewer and/or consumer an opportunity to observe the process of preparing a beer in a manner that previously was not available and/or envisioned.

The material utilized in transparent components of the brewing system and/or used in the process of the inventive concept is not particularly limited, and may be any material that transparent components of the brewing system may be made of that might be envisioned by one of skill in the art. According to some embodiments of the inventive concept, the transparent components used herein may be made of a borosilicate glass product that is resistant to, for example, temperature shock or thermal shock, i.e., a glass product that is resistant to shattering when exposed to rapid, sudden, and/or extreme changes in temperature, for example, changes in temperature of greater than at least about 15° C. per minute, at least about 20° C. per minute, at least about 25° C. per minute, at least about 30° C. per minute, or even greater than at least about 30° C. per minute. However, transparent materials used in producing/making the transparent components are not limited thereto. Transparent materials used may be any material that have suitable qualities/characteristics, i.e., characteristics similar to, or superior to borosilicate glass including, but not limited to, for example, transparency, UV shielding, rigidity, strength, etc. for use in the brewing system of the inventive concept.

This also includes materials not presently known, envisioned, developed, and/or created/prepared. If, for example a new material with similar or superior properties and transparency to, for example, borosilicate glass, were to be produced and/or developed, use of such may be envisioned for applications in the brewing system and/or used in the process as elaborated herein without limitation, or in some embodiments, for a single-use brewing system design, a similar intended purpose may be achieved with, for example, a cheaper substitute. Furthermore, with long-term environmental toxicity of the finished product and/or environmental sustainability issues notwithstanding, a host of polymers/polymeric materials may be envisioned and used as cheap and/or disposable substitutes in some embodiments of brewing system and/or used in the process of the inventive concept to convey similar educational principles.

The shape and/or size/dimensions of vessels, such as transparent vessels as described herein and included in the system/brewing systems of the inventive concept are not particularly limited, and may be of any shape and/or size/dimensions appropriate for a vessel/transparent vessel, for example, a grist case, mash/lauter tun, boil kettle, hopback, whirlpool, heat exchanger, and/or fermenter(s) as may be envisioned and appreciated by one of skill in the art that is appropriate for use in/included in a brewing system and/or the process for producing, for example a beverage as described herein, such as a fermented beverage, for example, a beer. It will be appreciated that the shape and/or dimensions of vessels included in a system/brewing system according to the inventive concept may be dependent on the size and/or scale of a batch of the beverage prepared by the brewing system and/or process of the inventive concept, and may vary accordingly without limitation.

The size and/or scale of a batch of a beverage prepared by the brewing system and/or the process of the inventive concept is not particularly limited. In some embodiments, the brewing system may be a small-scale system. It will be appreciated by one of skill in the art that "small-scale" may generally refer to batches at most about 100 L, or about one beer barrel (bbl, about 31 US gallons, or about 117 L) in size, such as, for example, about 0.5-50 L, about 1-25 L, or about 2-10 L. In some embodiments, the brewing systems and/or the processes of the inventive concept may brew about 25 bbls, about 50 bbls, about 75 bbls, about 100 bbls, or even about 150 bbls of beer per year, depending on the number of operators of the brewing system/manpower and the number of fermenters associated with the system and process.

Brewing systems of the inventive concept may be used as part of semi-professional, professional, and/or commercial applications, i.e., used in taprooms, in taprooms of microbreweries or breweries, and/or in microbreweries or breweries, for preparing a product for sale and/or consumption. Nevertheless, in some embodiments, brewing systems of the inventive concept also encompass those that may be used in household/home/personal applications, producing batch sizes of, for example, at most about 10 L, for example, about 1-10 L, about 2-8 L, or about 4-6 L.

The process by which a beverage is prepared using the brewing system of the inventive concept is not particularly limited, and it will be appreciated by one of skill in the art that the process for preparing a beverage using the brewing system of the inventive concept may be any. For example, the process may include: providing milled grain to a mash/lauter tun; generating a wort or sweet wort; circulating the wort or sweet wort to and from the mash/lauter tun and a recirculation vessel; transferring recirculated wort or sweet wort from the recirculation vessel to a boil kettle; transferring wort or sweet wort from the boil kettle to a hopback; passing the wort or sweet wort through an agricultural product in the hopback; transferring the wort or sweet wort from the hopback to a whirlpool; passing the wort or sweet wort from the whirlpool through a heat exchanger; and transferring the wort or sweet wort passing through the heat exchanger to a fermenter, and to provide a beverage. In some embodiments, the beverage may be beer, wine, coffee, tea, kombucha, water kefir, or ginger beer. In some embodiments, the beverage may be beer or wine. In some embodiments, the beverage may be a beer. In some embodiments, the agricultural product in the hopback through which the wort or sweet wort passes through is, for example, hops, as may be used in the preparation of beer. The hops used are not particularly limited, and may be any variety of hops that would be appreciated by one of skill in the art.

The ingredients used in the preparation of a beverage as described herein using the system and/or process of the inventive concept are not particularly limited. It will be appreciated that any ingredient known by one of skill in the art that may be used in preparing a beverage, for example, in the preparation of a beer, when using the brewing system and/or process of the inventive concept. Similarly, the "style" of a beverage, for example, the style of beer that can be prepared by using the brewing system and/or process as described herein is not particularly limited, and may be any style of beer, e.g., ale, lager, porter, stout, wheat beer, etc. known and appreciated by one of skill in the art that can be prepared using a brewing system including the elements as described herein when in the hands of and as used by one of skill in the art.

The present inventive concept provides a way for brewers to demonstrate to the uninitiated what makes their craft important and the ingredients they choose valuable. For viewers and/or consumers, it can be a window into the craft process that is not necessarily intuitive or beginner friendly unless one has performed the brewing process a priori. This inventive concept combines the solutions to these two problems in a way that is profitable for brewers, while empowering for consumers to make better choices for themselves.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A brewing system comprising:
 a) a grist case configured to provide a full view of grains contained therein;
 b) a mash/lauter tun configured to form a wort by enzymatically breaking down the grains received from the grist case;
 c) a recirculation vessel configured to store a transparent water bath and to receive the wort from the mash/lauter tun;
 d) a boil kettle configured to boil the wort received from the recirculation vessel;
 e) a hopback configured to pass a hot wort through hops contained therein;
 f) a whirlpool configured to spin the wort received from the hopback;

g) a heat exchanger configured to receive the wort from the whirlpool to exchange heat with cooling water; and/or
 h) at least one fermenter configured to add yeast to the received cooled wort from the heat exchanger resulting in the fermentation and production of beer,
 wherein at least one of a)-f) and h) is transparent and wherein a)-h) are placed on load cells.

2. The brewing system of claim 1, wherein at least half of a)-f) and h) are transparent.

3. The brewing system of claim 1, wherein all of a)-f) and h) are transparent.

4. The brewing system of claim 1, wherein the whirlpool is a low-profile whirlpool.

5. The brewing system of claim 1, wherein the heat exchanger is a two-stage counter-flow heat exchanger.

6. The brewing system of claim 1, further comprising thermometers for displaying temperatures of wort or sweet wort and cooling water entering and exiting the heat exchanger.

7. The brewing system of claim 1, wherein a)-f) and h), if transparent, is resistant to temperature shock.

8. The brewing system of claim 7, wherein a)-f) and h), if transparent, is made of borosilicate glass.

9. A beverage prepared by the brewing system of claim 1.

10. The beverage of claim 9, wherein the beverage is beer, wine, coffee, tea, kombucha, water kefir, or ginger beer.

11. The beverage of claim 9, wherein the beverage is beer.

12. A process of preparing a beverage comprising use of the brewing system of claim 1.

13. A process of brewing a beverage comprising:
 a) providing milled grain to a mash/lauter tun;
 b) generating a wort or sweet wort;
 c) circulating the wort or sweet wort to and from the mash/lauter tun and a recirculation vessel;
 d) transferring recirculated wort or sweet wort from the recirculation vessel to a boil kettle;
 e) transferring the wort or sweet wort from the boil kettle to a hopback;
 f) passing the wort or sweet wort through an agricultural product in the hopback;
 g) transferring the wort or sweet wort from the hopback to a whirlpool;
 h) passing the wort or sweet wort from the whirlpool through a heat exchanger; and
 i) transferring the wort or sweet wort passing through the heat exchanger to a fermenter,
 wherein at least half of the mash/lauter tun, the recirculation vessel, the boil kettle, the hopback, whirlpool, and/or the fermenter are transparent and placed on load cells.

14. The process of claim 13, wherein the mash/lauter tun, recirculation vessel, boil kettle, hopback, whirlpool, and/or fermenter are all transparent.

15. The process of claim 13, wherein the milled grain is provided from a grist case.

16. The process of claim 15, wherein the grist case is transparent.

17. A beverage prepared by the process of claim 13.

18. The beverage of claim 17, wherein the beverage is beer, wine, coffee, tea, kombucha, water kefir, or ginger beer.

19. The beverage of claim 17, wherein the beverage is beer.

* * * * *